(12) United States Patent
Yang

(10) Patent No.: US 10,680,833 B2
(45) Date of Patent: Jun. 9, 2020

(54) OBTAINING AND USING TIME INFORMATION ON A SECURE ELEMENT (SE)

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 15/686,023

(22) Filed: Aug. 24, 2017

(65) Prior Publication Data
US 2017/0353320 A1 Dec. 7, 2017

Related U.S. Application Data

(63) Continuation-in-part of application No. 15/442,016, filed on Feb. 24, 2017, now Pat. No. 10,523,447.
(Continued)

(51) Int. Cl.
*H04L 9/32* (2006.01)
*H04L 9/08* (2006.01)
(Continued)

(52) U.S. Cl.
CPC .......... *H04L 9/3268* (2013.01); *H04L 9/0825* (2013.01); *H04L 9/3239* (2013.01); *H04L 9/3247* (2013.01); *H04L 63/0442* (2013.01); *H04W 12/0806* (2019.01); *H04W 12/12* (2013.01); *H04L 63/123* (2013.01);
(Continued)

(58) Field of Classification Search
CPC . H04L 2209/38; H04L 9/3239; H04L 9/0825; H04L 63/0442; H04L 9/3247; H04L 63/1425; H04L 2209/56; H04L 63/123; H04L 2463/121; H04W 12/12;
(Continued)

(56) References Cited

U.S. PATENT DOCUMENTS 10,389,518 B2 * 8/2019 Chen ...................... H04L 9/3236
10,417,217 B2 * 9/2019 Pierce ................. G06F 16/2379
(Continued)

OTHER PUBLICATIONS

Blockchain and Smart Card Technology; A Secure Technology Alliance Payments Council White Paper; Version 1.0; Mar. 2017 (Year: 2017).*
(Continued)

*Primary Examiner* — James R Turchen
(74) *Attorney, Agent, or Firm* — Dickinson Wright RLLP

(57) ABSTRACT

A secure element (SE) with a notion of time useful for checking secure items is disclosed herein. Use of Public Key Infrastructure (PKI) with secure elements is improved by verifying secure items used by an SE. Methods of obtaining time information by the SE include push, pull, opportunistic, local interface, and multi-check methods. The SE uses the time information to evaluate arriving and stored public key certificates and to discard those which fail the evaluation. The SE, in some embodiments, uses the time information in cooperation with certificate revocation lists (CRLs) and/or online certificate status protocol (OCSP) stapling procedures. A multi-check architecture is provided herein by which more than entity is involved in checking a time value before the time value reaches the SE. The multi-check architecture uses both PKI and blockchain techniques.

20 Claims, 19 Drawing Sheets

Related U.S. Application Data

(60) Provisional application No. 62/300,698, filed on Feb. 26, 2016.

(51) Int. Cl.
*H04L 29/06* (2006.01)
*H04W 12/12* (2009.01)
*H04W 12/08* (2009.01)
*H04W 12/10* (2009.01)
*H04W 12/00* (2009.01)

(52) U.S. Cl.
CPC ...... *H04L 63/1425* (2013.01); *H04L 2209/38* (2013.01); *H04L 2209/56* (2013.01); *H04L 2463/121* (2013.01); *H04W 12/00502* (2019.01); *H04W 12/10* (2013.01)

(58) Field of Classification Search
CPC .............. H04W 12/0806; H04W 12/10; H04W 12/00502
See application file for complete search history.

(56) References Cited

U.S. PATENT DOCUMENTS

| | | | |
|---|---|---|---|
| 10,437,630 B2 * | 10/2019 | Curtis | G06F 9/466 |
| 2004/0187014 A1 | 9/2004 | Molaro | |
| 2006/0248345 A1 | 11/2006 | Ishidera | |
| 2006/0288211 A1 | 12/2006 | Vargas et al. | |
| 2011/0010553 A1 | 1/2011 | Cahn | |
| 2013/0227646 A1 | 8/2013 | Haggerty et al. | |
| 2013/0339742 A1 | 12/2013 | Ignatchenko et al. | |
| 2015/0222635 A1 | 8/2015 | Yang et al. | |
| 2016/0065378 A1 | 3/2016 | Kim et al. | |
| 2016/0342977 A1 * | 11/2016 | Lam | G06Q 20/02 |
| 2017/0103468 A1 * | 4/2017 | Orsini | G06Q 40/12 |
| 2017/0163733 A1 * | 6/2017 | Grefen | H04L 9/3236 |
| 2017/0206382 A1 * | 7/2017 | Rodriguez De Castro | G06F 21/72 |
| 2017/0213209 A1 * | 7/2017 | Dillenberger | G06Q 20/3829 |
| 2017/0228371 A1 * | 8/2017 | Seger, II | G06F 16/215 |
| 2017/0235970 A1 * | 8/2017 | Conner | G06F 21/6227 707/690 |
| 2017/0250826 A1 | 8/2017 | Yang et al. | |
| 2017/0262778 A1 * | 9/2017 | Ganesan | G06Q 10/06 |
| 2018/0039667 A1 * | 2/2018 | Pierce | G06Q 40/04 |
| 2018/0041487 A1 * | 2/2018 | Wang | H04L 63/0807 |
| 2018/0053182 A1 * | 2/2018 | Mokhasi | H04L 63/126 |
| 2018/0150835 A1 * | 5/2018 | Hunt | H04L 9/3236 |
| 2018/0322561 A1 * | 11/2018 | Arora | G06Q 30/0633 |

OTHER PUBLICATIONS

Antonopoulos, A.M., 2014. Mastering Bitcoin: unlocking digital cryptocurrencies. "O'Reilly Media, Inc.". (Year: 2014).*
Cooper, et al.; Internet X.509 Public Key Infrastructure Certificate and Certificate Revocation List (CRL) Profile; Network Working Group, Request for Comments: 5280, May 2008, 151 pages.
Eastlake; Transport Layer Security (TLS) Extensions: Extension Definitions, Internet Engineering Task Force (IETF), Request for Comments: 6066, Jan. 2011, 25 pages.
GSM Association; Official Document SGP.01—Embedded SIM Remote Provisioning Architecture, Version 1.1, Jan. 30, 2014, 85 pages.
GSM Association; Official Document SGP.22—RSP Technical Specification, Version 1.0, Jan. 13, 2016, 114 pages.
"The Trusted Execution Environment: Delivering Enhanced Security at a Lower Cost to the Mobile Market", GlobalPlatform, Jun. 2015, revised from Feb. 2011, 37 pages.
The Trusted Execution Environment: Delivering Enhanced Security at a Lower Cost to the Mobile Market, Jun. 2015, revised from Feb. 2011, 37 pages.
Brakeville et al.; "Blockchain basics: Introduction to distributed ledgers Get to know this game-changing technology and IBM's contributionto it", developerWorks, Dec. 15, 2016 (First published May 9, 2016), 7 pages.
Narayanan et al. with a preface by Jeremy Clark; "Bitcoin and Cryptocurrency Technologies", Draft—Feb. 9, 2016, 308 pages.
Mills et al.; "Network Time Protocol Version 4: Protocol and Algorithms Specification" Internet Engineering Task Force (IETF), Request for Comments: 5905, Jun. 2010, 110 pages.
Eastlake; "US Secure Hash Algorithms (SHA and SHA-based HMAC and HKDF)", Internet Engineering Task Force (IETF), Request for Comments: 6234, May 2011, 127 pages.
Catalini et al.; "Some Simple Economics of the Blockchain", MIT Sloan School Working Paper 5191-16, MIT Sloan School of Management, Nov. 23, 2016, 31 pages.

* cited by examiner

OBTAINING AND USING TIME INFORMATION ON A SECURE ELEMENT (SE)

CROSS-REFERENCE TO RELATED APPLICATION

This application is a continuation-in-part of U.S. patent application Ser. No. 15/442,016, "OBTAINING AND USING TIME INFORMATION ON A SECURE ELEMENT (SE)," filed on Feb. 24, 2017, which claims benefit of U.S. Provisional Patent Application No. 62/300,698, "OBTAINING AND USING TIME INFORMATION ON A SECURE ELEMENT (SE)," filed on Feb. 26, 2016, both of which are hereby incorporated by reference.

FIELD

The described embodiments relate to obtaining and using time information on a secure element (SE) for security purposes with respect to public-key certificates in a public key infrastructure (PKI) environment.

BACKGROUND

Communications of an SE, for example an embedded universal integrated circuit card (eUICC), may be authenticated using PKI techniques. Certificates used for authentication and confidentiality purposes can be generated by a trusted certificate issuer (CI). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

A digital signature is authentication data that binds the identity of the signer to a data part of a signed message. A certification authority (CA) is a trusted third party whose signature on a certificate vouches for the authenticity of the public key of the associated user identity. If the private key of the identified user becomes compromised, all holders of the certificate need to be notified. Notifying can be done, for example, with a certificate revocation list (CRL). Recipients of the CRL no longer trust messages signed with the corresponding public key of the identified user.

Also, a public-key certificate may expire at a certain point in time. So, separate from the compromise issue, there is a need to improve recognition of expired certificates. Generally, time-variant parameters can be used in identification protocols to counteract replay attacks and to provide timeliness guarantees.

A blockchain is a distributed arrangement that provides verification based on consensus. A well-known scheme using a blockchain is Bitcoin. In a blockchain scheme, the presence of an adversary is assumed. Participants, or nodes, that act in building the blockchain attempt to solve a hash puzzle. The hash puzzle is of the form $H(nonce\|previous\_hash\|tx\|tx\| \ldots \|tx) < target$, where $H(\ )$ is a hash function, e.g., SHA-256. A node which solves the puzzle then proposes the next block to be added to the block chain. The blockchain is visible to all participants. If any party attempts to alter a node some time earlier in the blockchain, each hash puzzle solution for block subsequent to the altered block becomes broken or incorrect. Each participant can see that such a broken blockchain does not agree with their own copy of the blockchain. The broken blockchain is thus not recognized by the nodes.

This arrangement is a scheme that operates as a distributed consensus protocol. In a distributed consensus protocol, some nodes are assumed to be faulty or malicious. The protocol terminates when all honest nodes agree on an input value, and the input value must have been generated by an honest node. In this case, the input value is the new block to be added to the blockchain. More details on blockchains can be found in "Bitcoin and Cryptocurrency Technologies," by Arvind Narayanan, Joseph Bonneau, Edward Felten, Andrew Miller, and Steven Goldfeder, Draft—Feb. 9, 2016; downloaded from "https://d28rh4a8wq0iu5.cloudfront.net/bitcointech/readings/princeton_bitcoin_book.pdf."

SUMMARY

Representative embodiments set forth herein disclose various systems and techniques for using time information in an SE to improve security in PKI environments.

An SE, in some embodiments, obtains time information from an authenticated message. An SE, in some embodiments, obtains time information from a trusted interface with a device local component. The SE can store the time information for subsequent use. The time information may be in the form of actual calendar time expressed in terms of year, month, day, hour, minute and second. In some embodiments, the time information is a counter value, where a counter state determining a counter value is recognized by the SE and at least one other entity.

Time information may be pushed to the SE by a CI on a periodic basis, for example. Time information may also be requested by the SE and then supplied by the CI in response to the request. In some embodiments, the SE opportunistically obtains time information by retaining time values parsed from messages primarily devoted to other purposes.

Time information may correspond to a CA or to a set of CAs. In some embodiments, the time information has a global aspect and can be applied to test security materials from any CA or other entity corresponding with the SE using PKI security.

After the SE obtains time information, the obtained time information can be used to replace pre-existing time information. For example, the obtained time information can be an update of the existing time information.

The obtained time information can be used to check for expiration of security materials, e.g., CRLs, public keys and certificates.

Time information can be used by the SE in conjunction with other certificate revocation schemes, e.g., the time information can be used when a CRL is received, when an OCSP stapling message is received, or when a server is compromised and a CI is establishing a new version number of certificates, also referred to as an epoch value. For example, the SE can trust a given server if the difference between a time in an OCSP stapling message and the time information falls within a security window, or if the given server can produce a certificate with the new epoch value.

The SE can store time information in, for example, a memory of the SE operating system or in an eUICC controlling authority security domain (ECASD).

This application also provides a multi-check architecture with three example embodiments, called scenarios. Multiple trusted sources participate to detect any tampering with a time value as the time value passes from a time source through two or more servers or nodes to the device and the SE. In a first scenario, a second server checks a time value being sent to the SE by a first server. If the second server agrees with the acceptability of the time value, the second server signs over the message with its own private key and passes the new message on toward the SE. In a second scenario, each server and the device use different roots of trust. Thus even though the servers are in a non-trust relationship, they can agree on the time, or any server in the path can reject the time and stop transmission of the time to the SE. In a third scenario, the new time is posted to a blockchain ledger. The new time becomes part of a blockchain when a miner solves the hash puzzle related to the new block holding the transaction indicating the new time. Because of distributed consensus, attempted alteration of the blockchain by a malicious node in terms of the time value will be detected by honest nodes. In the third scenario, a maliciously-altered block in the blockchain will not be recognized by the device and will not be recognized by the SE and thus a bogus time value will not corrupt the state of the SE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
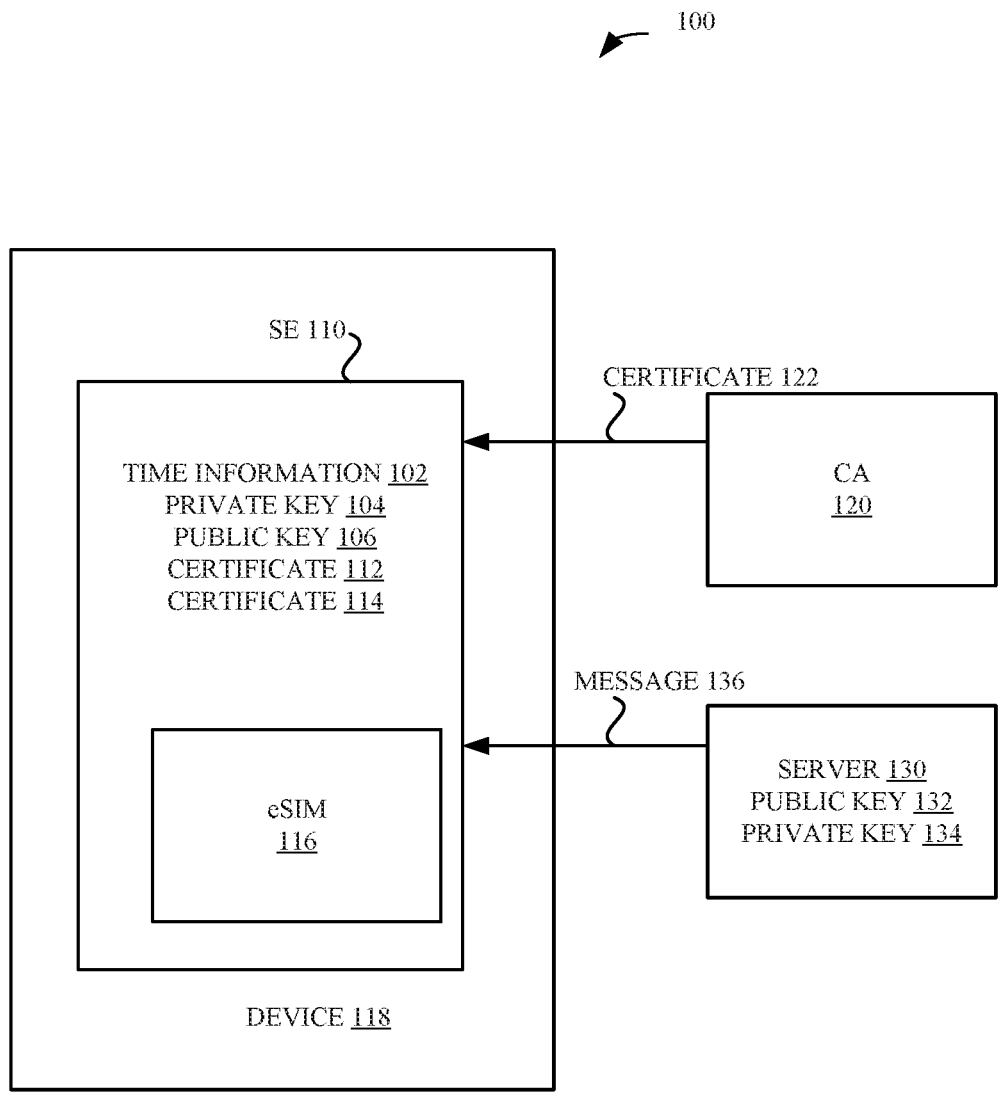
FIG. 1 illustrates an exemplary SE with time information in communication with a CA and a server, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

A wireless communication device may include memory resources and computational capacity to perform maintenance of its stored certificates using CRLs. A wireless communication device hosting an SE may also have a notion of actual time. An SE may be limited in memory, computational clock rate, and time information.

Interest is increasing in the use of securing SE communications using PKI. Some problems or challenges with using PKI by an SE are as follows: i) checking expiration of certificates, ii) checking validity of a CRL list, iii) checking the validity of OCSP stapling messages, and iv) removing expired or compromised certificates from certificate-related storage.

PKI

Communications of an SE can be authenticated using PKI techniques. PKI relies on the infeasibility of a third party determining a private key of a public key-private key pair from the public key. The public key is communicated in a data structure called a certificate. A message encrypted with the private key is trusted to be from the purported signing party (i.e., authenticated) if decryption of the message with the corresponding public key is successful and the certificate holding the public key has not been revoked.

Certificates

A certificate is a means by which a public key can be stored and distributed over unsecured media without danger of undetectable manipulation. In practice, X.509 certificates are commonly used. X.509 is an ANSI standard which defines a certificate data structure. A public key certificate is a data structure consisting of a data part and a signature part. The data part includes a public key and a string identifying the party associated with that public key. The data part can also include a validity time period of the public key. For example, the data part can hold a published time and an expiration time. In addition, the data part can hold a serial number of the certificate or public key. The signature part consists of the digital signature of a certification authority; the signature part is the result of a function computed over (based on) the data part.

A digital signature is authentication data which binds the identity of the signer to the data part. Signing transforms the data part and some secret information held by the signer into the signature. A CA is a trusted third party whose signature on the certificate vouches for the authenticity of the public key. Because the CA is trusted, the certificate allows transfer of the CA's trust in the identified party such that the certificate recipient can securely place their trust in the identified party. If the private key of the identified party becomes compromised, all holders of the certificate need to be notified so that they will no longer trust messages signed with the corresponding public key of the identified party. This notification can be done, for example, with a CRL or detected by a negative result from OCSP.

OCSP is an Internet Engineering Task Force (IETF) protocol specified by RFC 6960. OCSP stapling (see IETF RFC 6066) is an extension of OCSP. OCSP stapling allows the presenter of a certificate to provide a timestamped OCSP response signed by a CA to the party seeking the certificate. An SE can use OCSP stapling as a trust verification technique in order to reduce or eliminate storage of trusted certificates (public keys) and/or CRLs. The party wishing to communicate (the certificate presenter) with the SE may supply an OCSP stapling message to the SE on an as-needed basis.

Compromise or Expiry of a Certificate

If a third party obtains the private key of a public key-private key pair, the security of the system is broken. This is because the third party can act as an imposter and sign messages with the private key as if the third party were the identified party associated with the public key. Harm can be limited by notifying communicating parties that the associated certificate is now revoked. Thus, there is a need to improve the security of PKI-secured communications performed by an SE since a server trusted by the SE may become compromised.

Time

Time-variant parameters which serve to distinguish one instance of something from another are sometimes called nonces, unique numbers, or non-repeating values. A nonce is a value used no more than once for the same purpose. Random numbers include pseudorandom numbers which are unpredictable to an adversary. A sequence number can serve as a unique number identifying a message. A sequence number can be a version number for a file. Sequence numbers are specific to a set of entities who follow a pre-defined policy for numbering. Timestamps can be used to implement time-limited access privileges.

A user of a timestamp obtains a timestamp from a local clock and cryptographically binds it to a message. Upon receiving the timestamped message, a second party obtains the time from its own clock and subtracts the timestamp received. The message is valid if the timestamp difference is in an acceptable security window. The security of timestamp-based verification relies on use of a common time reference; this requires that the sender's clock and the recipient's clock be at least loosely synchronized.

SE, eUICC

One example of an SE is an embedded universal integrated circuit card (eUICC). A eUICC can host profiles. A profile is a combination of operator data and applications provisioned on an eUICC in a device for the purposes of providing services by an operator. A profile can contain one or more secure data used to prove identity. An eSIM is an example of a profile. An eSIM is an electronic subscriber identity module.

An eUICC includes an operating system, and the operating system can include ability to provide authentication algorithms to network access applications associated with a given operator. The operating system also can include the ability to translate profile package data into an installed profile using a specific internal format of the eUICC. An ECASD provides secure storage of credentials required to support the security domains on eUICC. A controlling authority security domain (CASD) may also be referred to as a "key store" herein.

SE Time Information

In some embodiments provided herein, an SE stores time information in order to improve checking of secure materials. The time information is stored in a time information variable and the value of the time information variable at a given moment is a time information value. The actual time can be stored, for example in a numerical string "yyyymmddhhmmss" providing four decimal places for the year, "yyyy", two for the month, two for the day of the month, two for the hour of the month, two for the minute of the hour and two for the second of the minute. In some embodiments, an SE may record a time information value as the value of an increasing counter. One example of an increasing counter controlled centrally may be referred to as an epoch.

A CI or other CA may refresh the time information in the SE periodically. The refresh period, in some embodiments, is about one day. The refresh period is a security requirement. The refresh period, in some embodiments, is shorter than an average time between server compromise or average time between certificates expiring. The refresh period is sufficiently long to avoid unnecessary communication burden for the SE, and, for example, the CI. For example, on a daily basis, a CA or the CI may push a new time information value to the SE, in some embodiments. The SE, in some embodiments, pulls a new time information value from a CA or the CI. That is, the SE sends a message requesting a new time information value.

The time information value received by an SE is signed by a CA. By implementation, time information signed by other trusted off-card entities (off-SE entities) may also be acceptable based on the SE configuration. Time information that is not under the signature of a trusted entity is not recognized or used by an SE.

Distinct time information values, in some embodiments, are maintained in the SE for two or more CAs. For example, a first CA may send a first counter value to the SE and a second CA may send a second counter value to the SE. In some embodiments, a CI provides widespread time information and the SE maintains a single time information value. For example, a first CI may send an actual time value on a first day. In some embodiments, a second CI, different than the first CI, may send an actual time value on the first day or another day.

In some embodiments, the time information value is updated on an opportunistic basis based on unrelated transactions between the SE and any trusted party. For example, any signed and verified time information from a CRL, OCSP, or OCSP stapling message can be used by the SE to update its time information. Since many transactions are unscheduled, these time information updates occur randomly or stochastically. The stochastic time information value update incurs no additional communication overhead because it occurs in parallel or in the background to an unrelated transaction.

Time information, in some embodiments, is obtained over a trusted interface between the SE and a local component of the device.

Epoch

A CA may increase an epoch value; this will be reflected in subsequently issued certificates. As discussed above, an epoch value may be a counter type of time information. In some embodiments, the epoch is increased when a new certificate is issued. The SE can verify that the epoch in a received certificate is higher than that of a current certificate, before storing the new certificate. Revoking certificates in an SE can be challenging due to various SE resource constraints; i.e., processing a large revocation list may be infeasible for an SE. To avoid maintaining revocation lists, some certificates can be associated with an epoch. If a CA is compromised, the CI (which may also be referred to as a root CA) creates a unique unused epoch value and reissues certificates for all legitimate entities with the new epoch value in each new certificate. At the SE, the SE saves the expected epoch of various servers in non-volatile memory. When a received certificate contains a higher epoch, the SE may update the corresponding epoch and reject any future certificates with a lower epoch; i.e., the SE will reject rogue servers possessing certificates that have not been signed since the CA was compromised.

SE Methods

Maintenance of a time information variable or parameter in an SE allows the SE to perform a certificate expiration and/or publication date and/or time check. For example, if an expiration time value in a certificate is earlier than the time information value stored in the time information variable, in some embodiments, the SE may i) discard the certificate, ii) request a new certificate, iii) use the OCSP protocol, iv) use the OCSP stapling protocol, and/or v) rely on an epoch value as part of authenticating communications from the certificate holder.

The SE, in some embodiments, may compare an incoming certificate or related message (e.g. OCSP stapling) time with the time information stored in the SE to ensure validity. The time checking can be done in several different ways. The purpose of the time checking is to check that the examined item (certificate, CRL, OCSP stapled message, or other secure message) is up-to-date, current, fresh, and/or not expired. The essential aspect of the time check is to measure a difference in time between the time information in the SE and a time value of some kind associated with the examined item. A thresholding measurement or acceptable difference may be indicated by use of a security window. A certificate, CRL, OCSP stapled message, or other secure message may be referred to herein as secure material.

For time information of an actual (calendar) type, the difference may be computed as follows. Let TM be the time information in the SE. Let TC be general time information parsed or read from the examined item (secure material). Let TDexp be the difference taken as TDexp=TM−TCexp, where TC may be denoted TCexp, and TCexp is an expiration time. The TDexp value, a difference, will be negative if the expiration time is in the future, that is, occurs later than the SE time information, TM. Let TDpub be a difference taken as TDpub=TM−TCpub. Where TCpub is a publication time. The value of TDpub will in general be positive. In some embodiments, if TC represents an expiration time, TCexp, and TD is zero or positive, the SE discards the examined item and does not process any messages using it because the expiration time is not in the future. For example, if the examined item is a certificate for a particular user identity and TD is zero or positive, the SE discards the certificate, and optionally, requests a new certificate for the particular user identity.

In some embodiments, TCpub may be the issuance time of the certificate or the CRL/OCSP published time in a response message. A positive TDpub value may be considered more reliable and a negative TDpub value may be considered unreliable in typical cases. However due to possible TM update delays, TDpub may be negative; a negative value of TDpub of small magnitude can be accepted within a security window based on configuration. It is then configurable whether TM should be updated by using TCpub as new time information based on the trust level of the source of the obtained TCpub value.

The extent of the age of the examined item versus TM can be determined with the security window. Let the value of the security window be represented by a positive value TW. Determine TDexp as above. If TDexp<TW, then the time associated with the examined item, in some embodiments, is deemed to be within the security window. If TDexp is greater than or equal to TW, then the examined item is considered a security risk, and the examined item will be discarded because the expiry time was too long ago. In some embodiments, TDpub is determined as above. The expected outcome is that TDpub>0. However, there may be a lag in updating TM, such that a small negative value of TDpub would not indicate a fault. Thus, if 0<−TDpub<TW is true for TDpub<0, then the examined item is not considered a security risk solely based on the published time TCpub. The certificate may be identified as a security risk for other reasons.

In general a calculated time difference is referred to herein as TD. Whether the time difference corresponds to a publication time, expiration time, or another time is determined by the nature of the time obtained from the security material. In any case, TM can be used for a security check to provide a TD to compare with an appropriate security window TW as described above.

For time information of a counter type, the difference may be computed as follows. Let TMcounter be the time information in the SE. Let TCcounter_exp be the time information parsed or read from the examined item (secure material) corresponding to an expiration time. Let TDcounter_exp be the difference taken as TDcounter_exp=TMcounter−TCcounter_exp. If TCcounter_exp is a current version number or an epoch value, then this difference will be zero if the examined item is current or up-to-date. In some embodiments, if TDcounter_exp is positive, the SE discards the examined item and does not process any messages using it. For example, if the examined item is a certificate for a particular user identity and TDcounter_exp is positive, the SE discards the certificate, and optionally, requests a new certificate for the particular user identity.

Corresponding calculations for a certificate publication time using counter type time information, in some embodiments, follow a similar approach. That is, TDcounter_pub=TMcounter−TCcounter_pub, and the same reasoning as applied for TCpub, TDpub, and TW above. For example, it is expected that TDcounter_pub will be positive. Small negative values of 0<−TDcounter_pub<TWcounter are not considered a security risk solely based on TCcounter_pub.

The SE may use the stored time information, in some embodiments, together with revocation schemes such as CRL and OCSP. For example, upon receiving a CRL, the SE may i) immediately place on an untrusted list identities of servers whose certificates are identified in the CRL, and ii) continue to rely on the certificates of servers not identified in the CRL. In some embodiments, the SE receives an update to an epoch value from a CI, for example. The SE then, in some embodiments, does not communicate with the servers identified in the CRL until new certificates for those servers arrive at the SE with the updated epoch value. This allows smooth transition between new and old epoch update and yet allow manageable size of CRL stored on the client side.

In some embodiments, an SE obtains an OCSP stapling message including a time at which the CA timestamped and signed the OCSP response. The SE may then compare the time information value stored in the SE against the signed timestamp of the OCSP stapling message (OCSP stapling timestamp). If the difference of the SE time information value and the OCSP stapling timestamp is within an acceptable window, the SE, in some embodiments, will consider the associated certificate to be trustworthy (i.e. not stale, not compromised, not revoked).

Also, the SE may check the epoch in addition to checking the OCSP stapling timestamp. Depending on the security required, the SE may trust the certificate associated with the sender if either the difference of the SE time information value and the OCSP stapling timestamp is within a security window or if the epoch value associated with the received OCSP stapling message matches a current epoch value maintained by the SE. In some embodiments, the SE may require that all indications concerning the OCSP stapling message are not stale. That is, the SE may only process the message if the difference of the SE time information value and the OCSP stapling timestamp is within the security window and the epoch value associated with the received message matches a current epoch value maintained by the SE.

Periodically, or after updating the timestamp information, the SE may perform a cleanup operation on the certificates and/or CRL list store in the SE. For example, after updating the time information on the SE, the SE operating system (OS) may identify information that is stale based on being too old compared to the time information value. For example, any certificate with an expiration time before an actual time stored as time information can be discarded and/or the associated server moved to an untrusted list. Any certificates which are vouched-for based on OCSP stapling can be discarded if a difference between the SE time information value and the timestamp included in the OCSP stapling message falls outside of a security window. The window may, for example, correspond to one day, one week, or one month.

In this way, trusted and stored public keys and certificates that have expired can be deleted from the memory or key store of the SE. Also, when a CRL list or entries in the CRL are no longer valid, the CRL list can be corrected by recognizing servers which have obtained new certificates from, for example, a CI. In addition, an untrusted list can be updated with servers whose certificates have expired or who fail the OCSP or OCSP stapling protocol. Servers which are associated with certificates having time information or OCSP information or OCSP stapling information which falls inside of a security window when compared with the SE time information may be listed on a trusted list of servers.

Embodiments will now be described with regard to the figures.

Obtaining and Using Time Information, Overview

FIG. 1 illustrates an exemplary system 100 for an SE 110 obtaining and using time information 102. The time information 102 corresponds to a time information value stored in a time information variable in the SE 110. The time information variable can be, for example, an addressed location in a memory of SE 110. SE 110 in some embodiments possesses a public key-private key pair 106/104. Exemplary stored certificates 112 and 114 are shown stored in the SE 110. The SE 110 may host an eSIM 116. The SE 110 may reside in a device 118. The device 118, in some embodiments, is a wireless communication device. In the exemplary arrangement 100, a CA 120 sends a certificate 122 to the SE 110. The certificate 122 is associated with an identity of a server 130. The server 130 associated with a public key-private key pair 132/134 sends a message 136 signed with the public key 132 to the SE 110.

The SE 110, in some embodiments, verifies the signature of the CA 120 on the certificate 122. If the verification is successful, that is, authentication of the certificate using the public key of CA 120 produces a correct result, then the SE 110 parses from the message received with the certificate 122 a time information value. In some embodiments, the SE 110 then checks the stored certificates 112 and 114 to see if they have expired.

The SE 110 can then determine, for example, if the time information value is for the CA 120 only (i.e., corresponds uniquely to CA 120) or is a widespread or quasi-global time value which is at least loosely synchronized with many CAs, CIs, and servers. Time information 102 of FIG. 1 represents, in some embodiments, several storage locations or time variables. Based on the determination, the SE 110 saves the time value as time information 102.

In some embodiments, the SE 110 verifies the signature of the CA 120 on the certificate 122 and compares an expiration time of the certificate 122 with the time information 102. The comparison may be done, for example, by subtracting the expiration time of the certificate 122 from the value of time information 102. For this type of comparison, the time information 102 may represent, for example, actual calendar time. If the expiration of the certificate is in the future with respect to the time information, that is the result of the subtraction is negative, then the certificate 122 is adjudged to be unexpired and valid. If the publication time of the certificate is in the future with respect to the time information, that is the result is positive but less than a fixed amount of time referred to herein as a security window, then the certificate 122 could also be adjudged to be valid. If the result is positive and not within the security window then the certificate 122 is adjudged to be stale or expired and not to be trusted. When the certificate 122 is determined to be untrusted, SE 110 will not process the message 136 because the SE 110 cannot be confident that the message 136 is indeed from the server 130. Possibly a mischievous or adversarial or computer-hacker entity has sent certificate 122 and message 136 to SE 110; careful security requires that message 136 in this case not be processed.

The SE 110 can request a new, updated certificate for the server 130. The new certificate will be based on a new public key-private key pair (not on the public key-private key pair 132/134).

Obtaining and Using Time Information, Exemplary Logic

Figure 2:
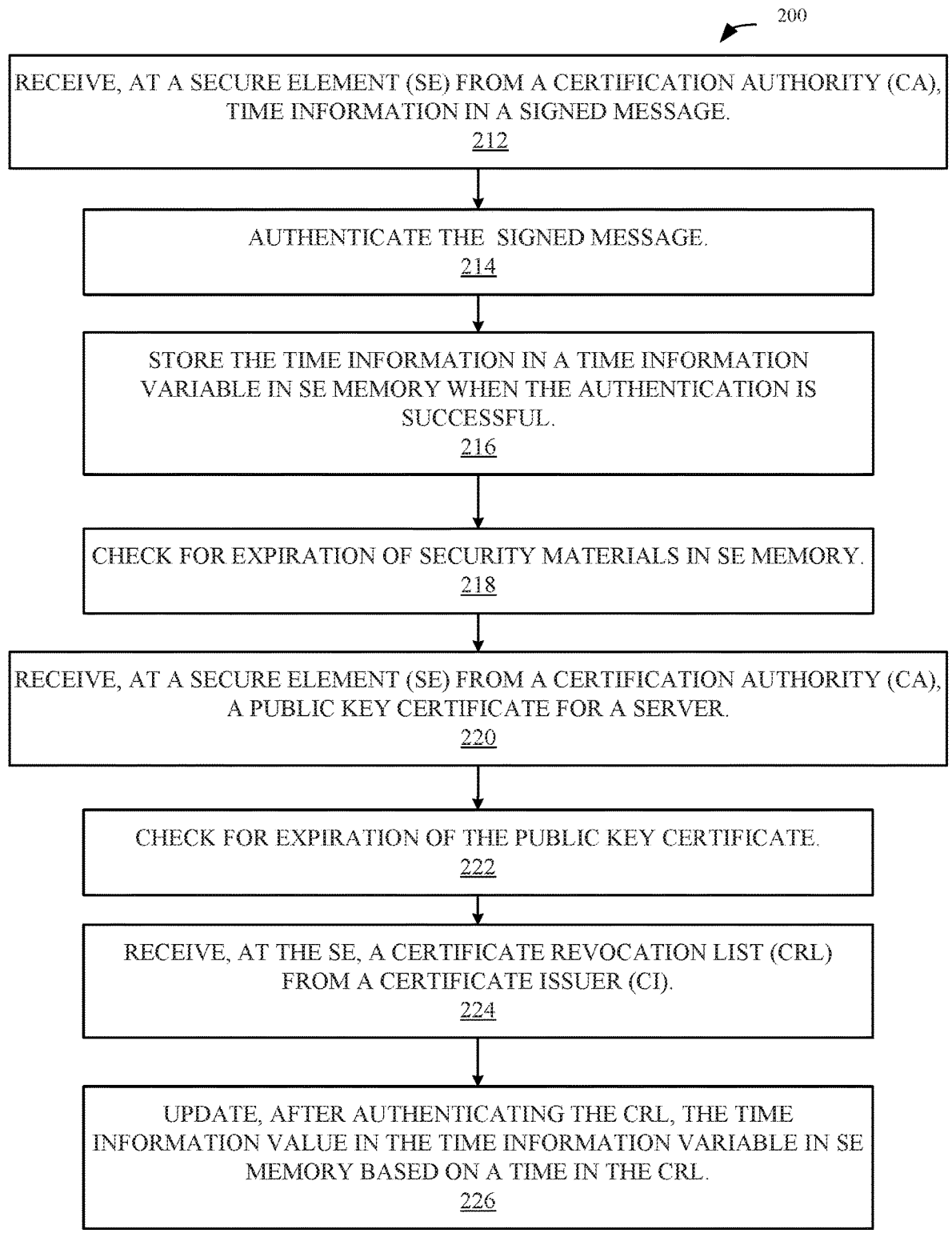
FIG. 2 provides exemplary logic illustrating obtaining and using time information, according to some embodiments.

FIG. 2 illustrates exemplary logic 200 for obtaining and using time information. At 212 an SE receives time information in a signed message from a CA and authenticates the message at 214. The time information is stored in the SE at 216 when the authentication is successful. The SE then performs a cleanup operation at 218. This cleanup operation may be done whenever a new time value is obtained, or when a duration of time is estimated to have passed based on the new time information and a time of a previous cleanup operation. The duration of time may be estimated by i) storing a time value each time a cleanup is done and ii) subtracting the previous time value from the new time value. In the exemplary logic 200, some time may pass between 218 and 220. 220 indicates a message reception from a CA, possibly unscheduled, of a certificate for a server. At 222, the SE checks an expiration time of the received certificate against the time value stored in the SE. If the certificate has expired (not shown), the SE will discard it. Some time may pass between 222 and 224. At 224, the SE receives a CRL, possibly unscheduled, from a CI. At 226, the SE does an authentication check on the CRL. If the signature of the received CRL proves to be that of the CI, then the SE proceeds to parse out time information from the CRL or CRL message from the CI and update the stored time information.

Push, Pull, Opportunistic, and Local Time Learning

Figure 3:
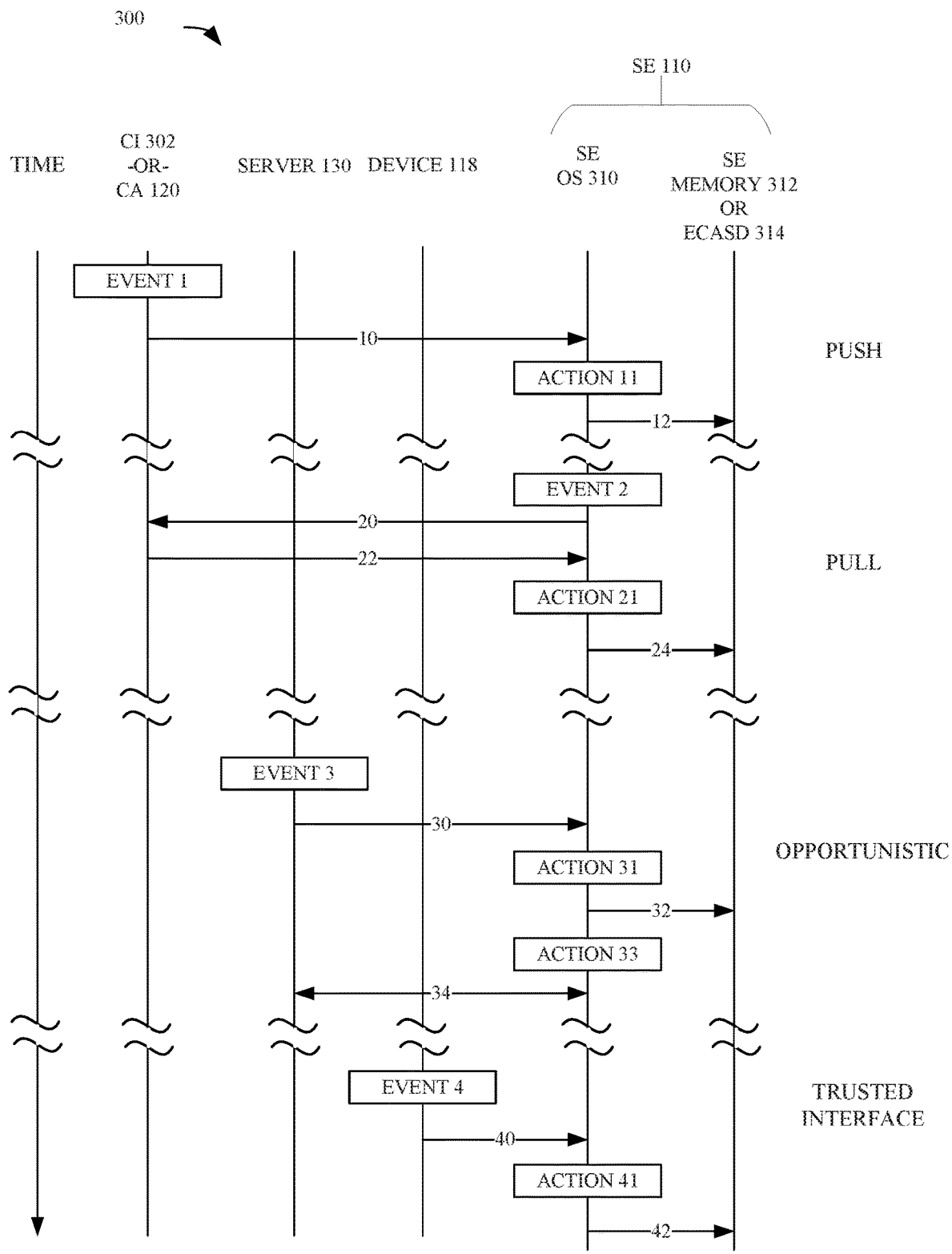
FIG. 3 illustrates exemplary push, pull, opportunistic, and local device sourcing approaches to obtaining time information, according to some embodiments.

FIG. 3 illustrates three exemplary approaches for the SE 110 to learn or obtain time information. FIG. 3 is a message flow diagram with time advancing from top to bottom. Parties communicating with each other or communication endpoints are shown across the top of the figure. The end points of the messages are represented as solid vertical lines below the party labels.

The first method of obtaining time is a push event (this portion of the drawing is annotated "PUSH"). This is indicated as Event 1 and it is initiated, for example, by a CI 302 or the CA 120. Time information is pushed to SE 110 in a message indicated by the left-to-right arrow denoted with the number 10 ("message 10"). When an SE OS 310 receives the pushed time information, it performs actions denoted as Action 11. The actions include authenticating message 10 and determining if the received time is later than the stored time. If the message 10 is authentic and the received time is later than the stored time, then the variable corresponding to time information 102 in an SE memory 312 or in an ECASD 314 is updated with the received time by message 12. The next read of the SE memory 312 or ECASD for time information 102 will produce a value corresponding to the time information received in the message 12.

The time axis is marked with a broken wavy line before the next event, Event 2. Event 2 corresponds to the SE initiating a request for time information with a message 20; this is a pull event. The CI 302 or CA 120, for example, responds to message 20 with message 22. Action 21, similar to Action 11, represents authenticating and checking the received time. Internal SE message 24 represents storing the new time information value in time information 102.

An opportunistic or stochastic method of learning time is triggered by unscheduled Event 3. Server 130, for example, initiates an unscheduled PKI challenge response sequence with SE 110 for some purpose unrelated to time information 102. Possibly the server 130 is unaware of the existence of a security time feature in the SE 110. Possibly the PKI challenge response is due to a user of the device 118. In any case, a message 30 arrives at the SE OS 310 bearing, incidentally, time information. The SE OS 310 parses out the time information and performs action 31, which is similar to actions 21 and 11 (authenticate, possibly check if the time is newer than the old time). If appropriate, SE OS 310 updates time information 102 using internal message 32. After Action 31 (or before, not shown) Action 33 and messages 34 may occur corresponding to the purpose of Event 3 and message 30 from the point of view of the server 130.

The SE, in some embodiments, receives the time information via a trusted interface with a local component of the device 118. A component of device 118 may initiate an Event 4 as shown in FIG. 3 (annotated "TRUSTED INTERFACE"). Event 4 may also be responsive to a pull request (not shown) similar to message 20, but directed to a local component of the device 118. A message 40 arrives at the SE OS 310 carrying time information. SE OS 310 processes the message at Action 41. Message 42 updates time information 102 using internal message 42.

Some SE Variables

Figure 4A:
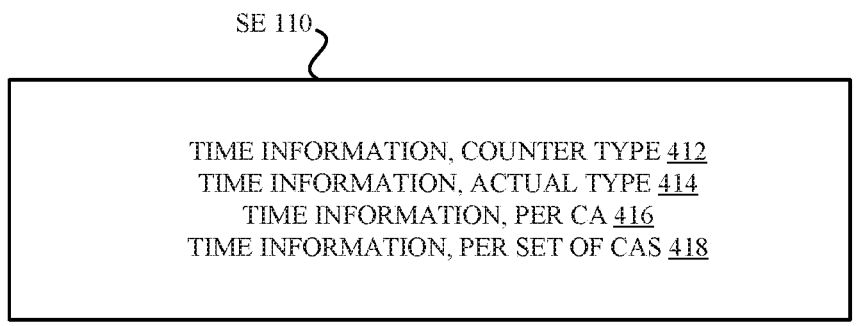
FIGS. 4A-4C illustrate exemplary time information embodiments, trusted and untrusted lists, and parameters and variables used in example certificate revocation schemes, according to some embodiments.
Figure 4B:
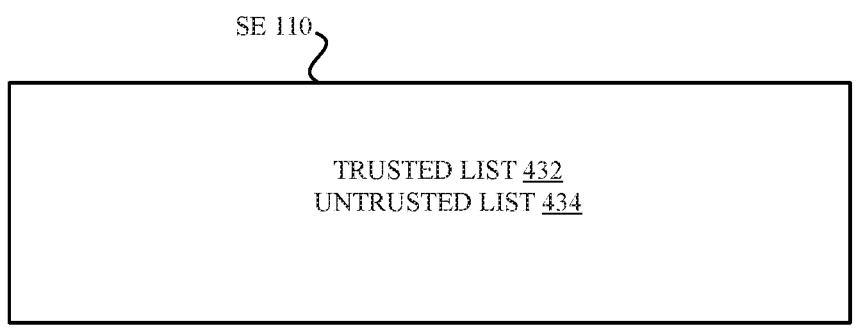
Figure 4C:
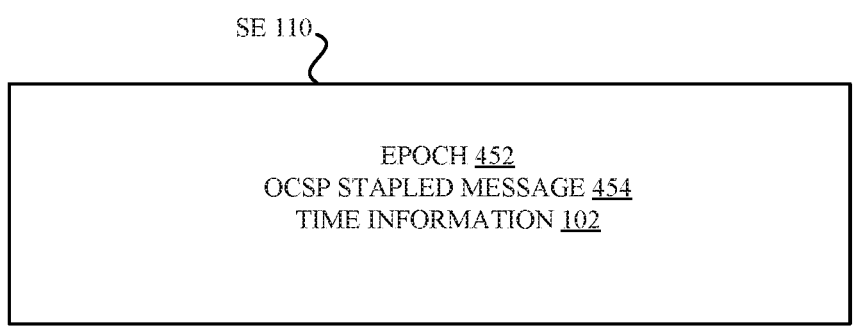

FIGS. 4A-4C illustrate various time and security-related variables, parameters and values in the SE 110.

FIG. 4A provides various time information formats and types, in some embodiments. The time information of messages 10, 22, and 30 of FIG. 3 may be of a counter type represented as time information, counter type 412 in FIG. 4A.

If a difference between a received time information value indicated as a counter type in a certificate being evaluated by the SE 110 and time information, counter type 412 is greater than a security window for counter types, the SE 110 can regard the certificate being evaluated as expired. The methods of time checking using counter type (and actual type) time information as discussed in the section "SE Methods" above may be applied in any of the embodiments described herein.

Alternatively, any one of the time information of message 10, or of the time information of message 22, of the time information of message 30 may be an actual calendar time type as indicated by time information, actual type 414 in FIG. 4A. If a difference between a received time information value indicated as an actual type in a certificate being evaluated by the SE 110 and time information, actual type 412 is greater than a security window for actual types, the SE 110 can regard the certificate being evaluated as expired.

If the time information is unique to a CA, a portion of time information 102 may be stored in a variable represented herein by time information, per CA 416 in FIG. 4A. Finally, if time information is for a set of CAs, or, for example, global or quasi-global, a portion of time information 102 may be stored in a variable represented herein by time information, per set of CAs 418.

FIG. 4B represents two summary forms of information that, in some embodiments, the SE 110 may maintain. Trusted list 432 represents a list of entities, servers, CAs, or CIs, for example, which the SE 110 trusts. For example, presence of an entity identity or user identity on trusted list 432 can indicate to the SE 110 that a certificate for that entity is stored in the SE 110 and has not been found to be expired or revoked. Untrusted list 434 can represent a list of entities, servers, CAs, or CIs, for example, which the SE 110 does not trust. For example, presence of an entity identity or user identity on untrusted list 434 can indicate to the SE 110 that no valid unexpired, or unrevoked certificate for that entity is stored in the SE 110. SE 110, in some embodiments, updates trusted list 432 and untrusted list 434 based on events. For example, a given entity identified on the untrusted list 434 may become a trusted entity if a trusted third party such as a CI provides a signed certificate for the given entity.

FIG. 4C illustrates exemplary variables for checking certificates. Epoch 452 represents a present epoch value, like a version number, which is current or up-to-date. A certificate received by the SE 110 which includes an epoch value older than epoch 452 may be considered to be expired. The variable indicated as OCSP stapled message 454 indicates a current or up-to-date voucher message from a CA indicating that a certificate of some entity is valid. The time information 102 can be used for detecting expired certificates.

Figure 5:
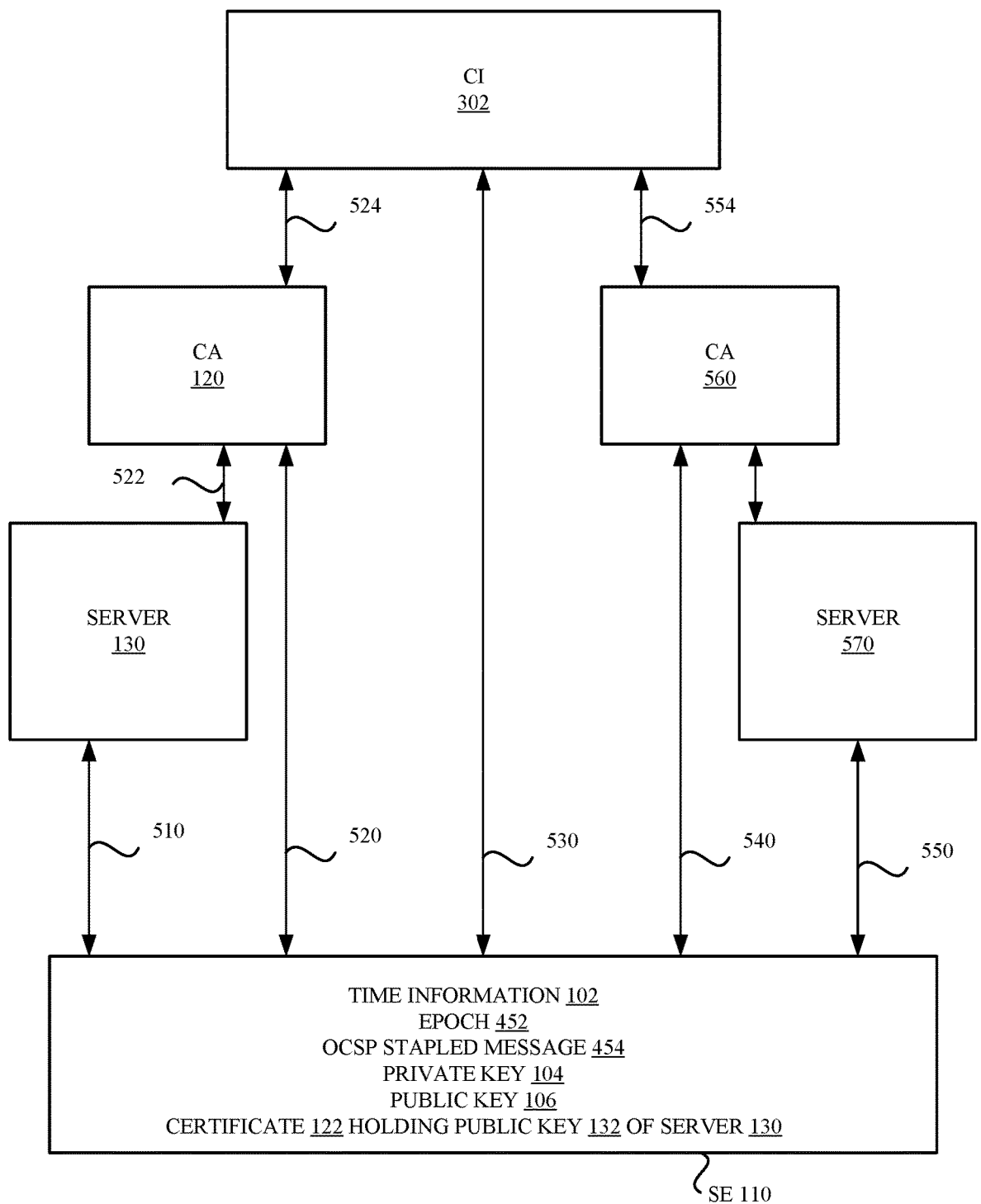
FIG. 5 illustrates an exemplary PKI environment including an SE with time information, according to some embodiments.

FIG. 5 provides an example of a PKI environment. The double-headed arrows of FIG. 5 are not limited to particular messages but represent example connectivity. The CI 302 is shown at the top of the figure and represents a trusted third party. Trust is shared with other entities by means of their trust in CI 302. For example, the CI 302 can provide via message exchange 524 a signed certificate to the CA 120. Similarly, the CI 302 can provide via message exchange 554 a signed certificate to a CA 520. The CA 120 can prove to server 130 that it is trustworthy using the certificate that the CA 120 was provided by the CI 302. The CA 120, may for example, provide a certificate to the server 130 including the public key 132, represented, for example, by messages 522.

Thus there is a chain of certificates leading from the root certificate of CI 302 to the certificate of CA 120 to the certificate of server 130. The SE 110 may, for example, obtain a certificate from the CI 302 via messages 530 at the time of manufacture. Such a certificate would include the public key 106 of the SE 110.

The server 130, the CA 120, the CI 302, the CA 520 and/or the server 530, may provide time information to the SE 102 via messages 510, 520, 530, 540, and 550, respectively.

Certificate 122 of FIG. 1 may pass in a message 520 from the CA 120 to the SE 110, for example. The presence of certificate 122 in the SE 110 is indicated in FIG. 5. Message 136 from the server 130 to the SE 110 may pass in a message 510, for example. Similarly, the push, pull and opportunistic events Event 1, Event 2 and Event 3 of FIG. 3 can occur among the entities indicated in FIG. 5. The push and pull events can be scheduled; they are deterministic in the sense that messages can be sent purposefully at certain times to cause time information refresh. For example, a push event can be scheduled by a server, CA, or CI daily. The SE can schedule a pull event daily. The SE 110 thus maintains useful time information 102. The time information 102 can be, for example, counter type 412 and/or actual type 414. The time information 102 can be, for example, per CA 416 and/or per set of CAs 418. The SE 110 may also have, for example, a value in Epoch 452 and an OCSP stapled message 454 associated with, for example, the server 530.

Figure 6:
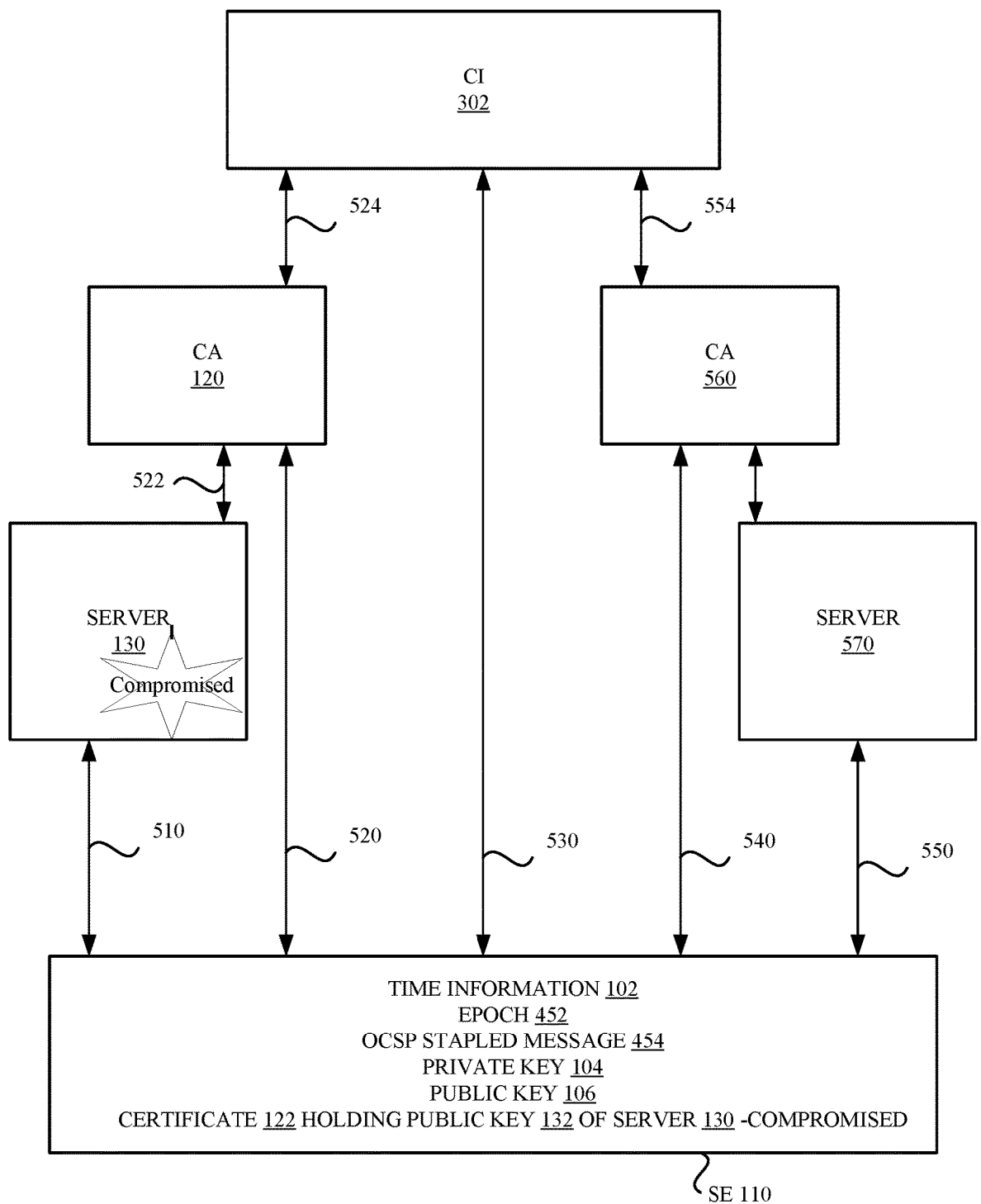
FIG. 6 illustrates an example event in the PKI environment of FIG. 5 in which the certificate of a server has become compromised or otherwise been withdrawn from use, according to some embodiments.

FIG. 6 illustrates an example situation among the entities of FIG. 5 when the PKI credentials of server 130 have been compromised as indicated by the star figure juxtaposed on server 130. In this case, a CA or CI will produce a CRL identifying the server 130 and distribute the CRL. The server 530 has not been compromised, and so is not listed in the CRL. Based on a satisfactory check on the expiration, epoch, or publication time of the CRL, SE 110 can process the CRL and hence treat the certificate 122 as untrustworthy as explained below.

In FIG. 6, certificate 122 holding public key 132 of server 130 is now unsuitable to be part of a chain of certificates all the way to the trusted party CI 302. Successfully decrypting, by the SE 110, a message signed with private key 134 using public key 132 no longer proves authentication.

After receiving the CRL, the SE 110 can evaluate the CRL using time information 102. As one example time check, after authenticating the CRL, the SE 110 can determine a difference between a time value parsed from the CRL and the value of the time information 102. If the difference indicates that the CRL time value is within a security window, the SE 110 can place confidence in the CRL and process it. Processing the CRL can include finding the certificate 122 to be untrustworthy and thus placing the identity of the server 130 on the untrusted list 432 and/or removing the identity of the server 130 from the trusted list 434.

In some embodiments, the CI 302 can initiate a migration of the PKI environment of FIG. 6 to a new epoch value after the compromise of the server 130. This will take some time. Perhaps several days such as seven days. While the new epoch value is propagating to the various entities and new certificates are issued indicating the new epoch value, the SE 110 may, for example, evaluate the legacy certificates of entities using OCSP stapling and the time information 102. For example, the SE 110 may possess a certificate for the server 530 with the old epoch value and the OCSP stapled message 454 may correspond to a certification of the server 530. If the identity of the server 530 is not on the CRL and the SE 110 either has a certificate of the server 530 with the most recent epoch value before the update, or the SE 110 determines that a difference between the time of the OCSP stapled message 454 for the server 530 and the time information 102 is within a security window, then the SE 110 can continue to use the certificate it has for the server 530; otherwise, the SE 110 can place the identity of the server 530 on the untrusted list 434.

Alternatively, the SE 110 can trust the existing certificate of the server 530 if i) the existing certificate for the server 530 has the most recent epoch value, and ii) the difference of the time in the OCSP stapled message 454 and the time information is within the security window. The SE 110 does not trust any identity listed on the CRL until new certificates are issued for those entities or user identifiers listed on the CRL. The SE 110, in some embodiments, trusts an entity not listed on the CRL which has the new epoch value in a new certificate issued after the CRL.

Logic for Obtaining and Using Time Information

Figure 7:
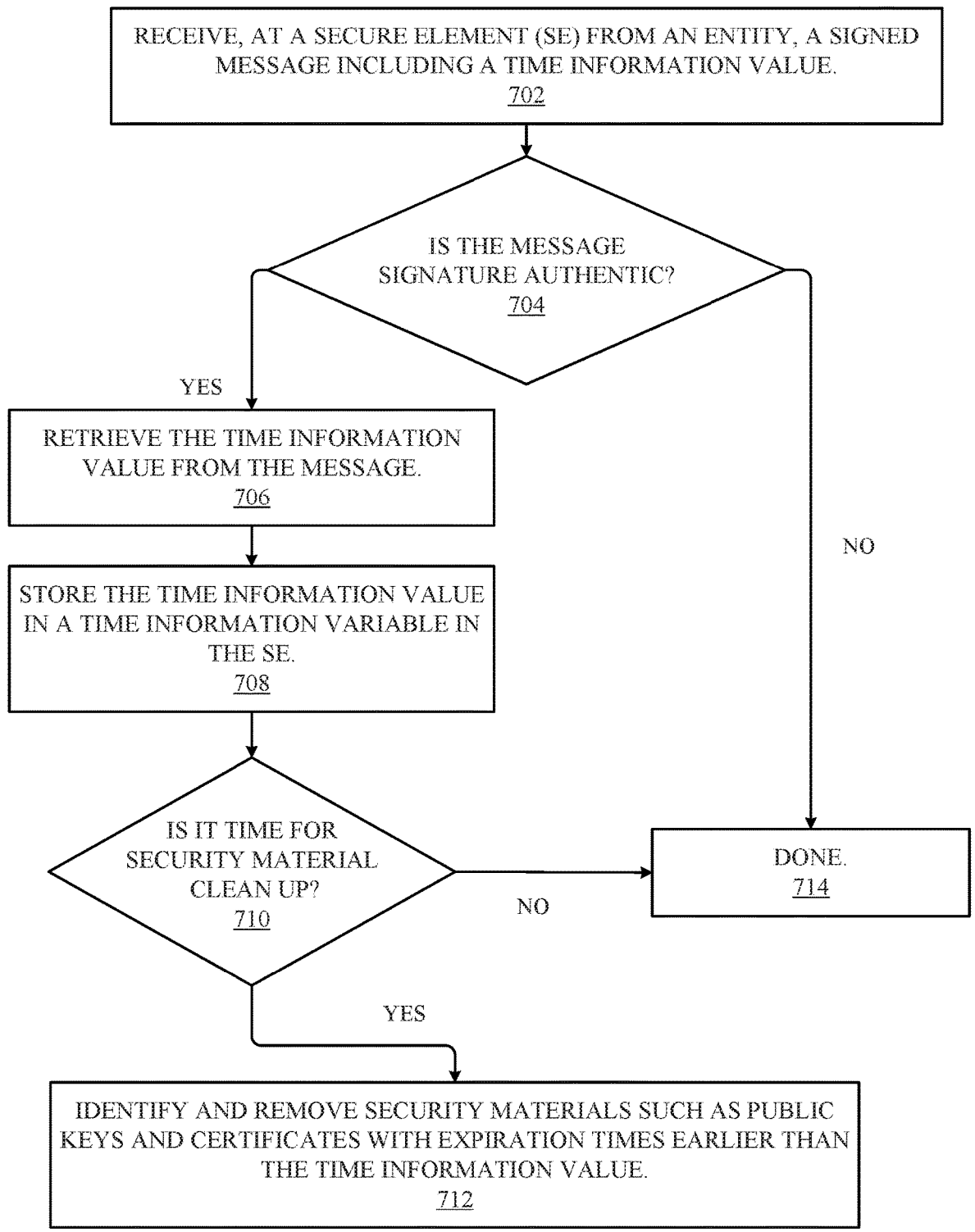
FIG. 7 illustrates exemplary logic for obtaining time information by an SE and performing a cleanup operation, according to some embodiments.

FIG. 7 illustrates exemplary logic 700 for obtaining time information. At 702 an SE receives a signed message including a time information value. At 704, the SE determines whether the message is authentic. If not, the message is ignored as indicated at 714. If the message is authentic, at 706 the SE retrieves or parses a time information value from the message. At 708, the SE stores the time information value in a time information variable in the SE. At 710, the SE determines whether it is time for a cleanup of security materials on the SE. If it is time for a cleanup, at 712 the SE identifies and removes security materials such as public keys and/or certificates whose expiration times are earlier than the time indicated by the time information value.

Logic for Processing a CRL Using Time Information

Figure 8:
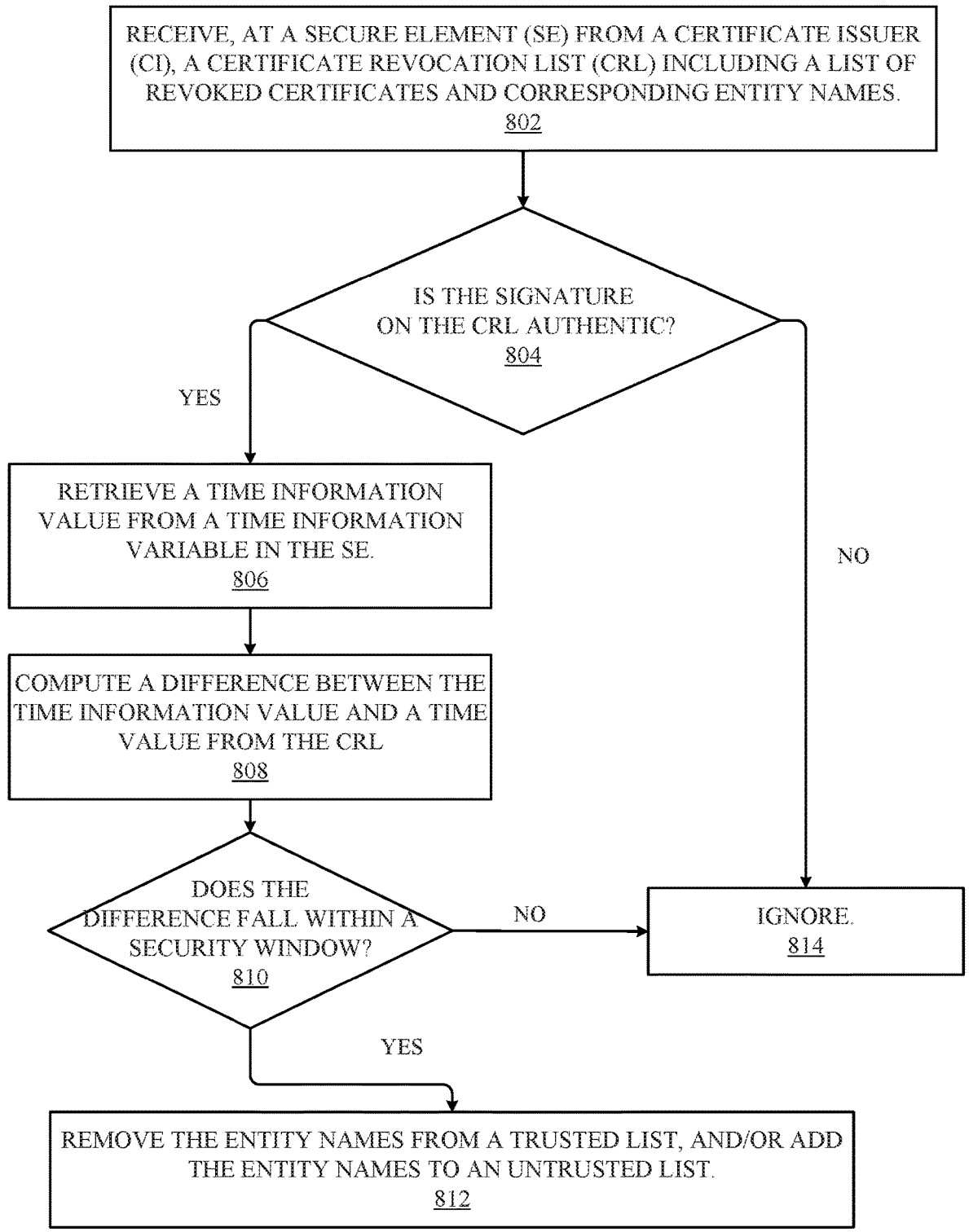
FIG. 8 illustrates exemplary logic for applying time information by an SE, according to some embodiments.

FIG. 8 illustrates exemplary logic 800 for processing a CRL using time information at an SE. At 802, the SE receives from a CI a CRL including a list of user identifies or serial numbers corresponding to revoked certificates. At 804, the SE determines whether the signature on the CRL is authentic. If the signature is not authentic, the CRL is ignored as indicated at 814. If the signature is authentic, the SE retrieves at 806 a time information variable from a time information variable in the SE. At 808 the SE computes a difference between the time information value and a time value parsed or read from the CRL. If the difference falls within a security window at 810, the SE proceeds to process the CRL at 812. At 812, the SE may, for example, remove the entity names found in the CRL from a trusted list and/or add the entity names found in the CRL to an untrusted list.

Some SE Details

Figure 9:
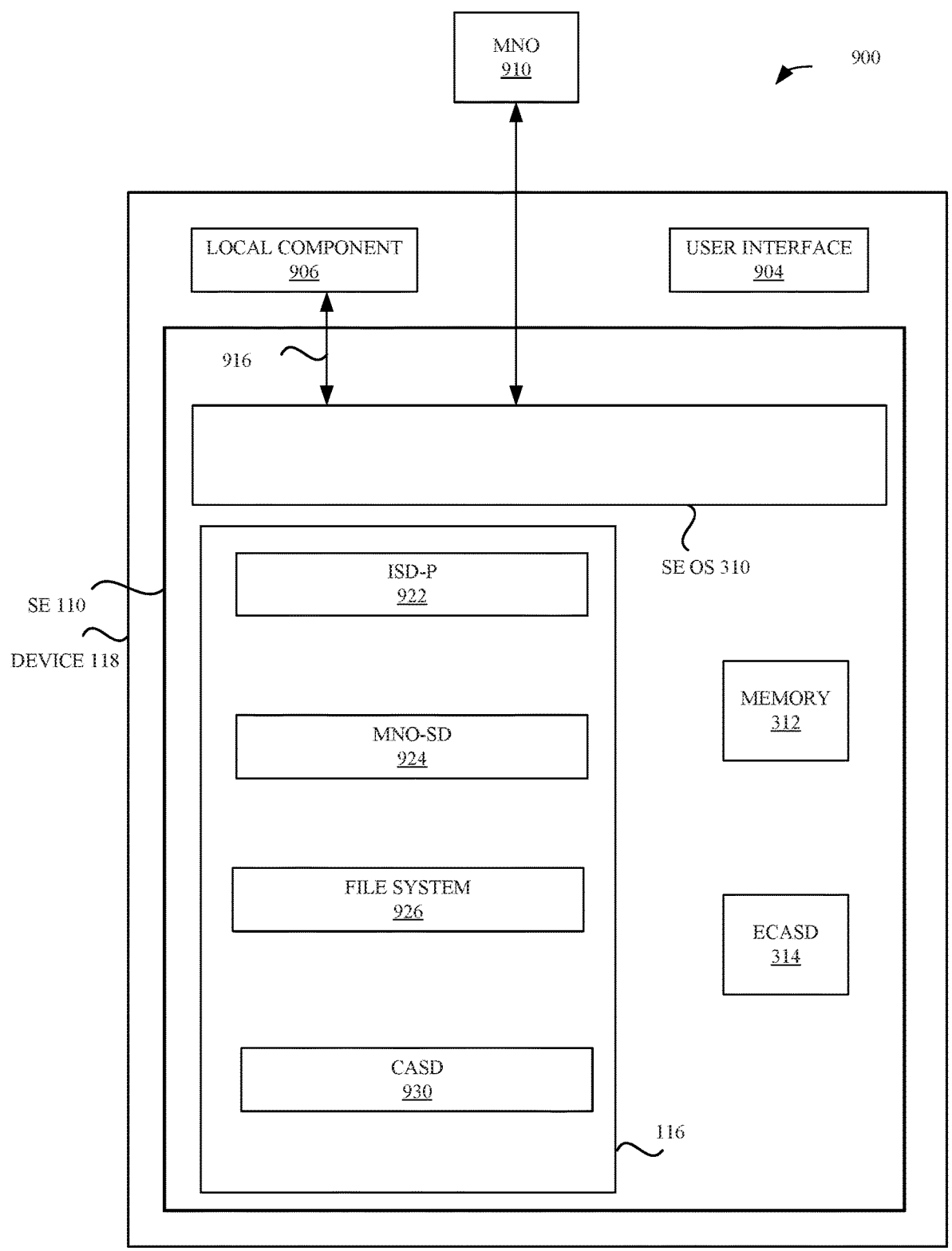
FIG. 9 illustrates exemplary internal features of an SE, according to an eUICC embodiment.

FIG. 9 illustrates some details of the SE 110 in a system 900. In an exemplary embodiment, the SE 110 may be an eUICC. The SE OS 310 may be, for example, in communication with a mobile network operator (MNO) 910. Device 118 can include, for example, a local component 906 in communication with the SE OS 310 over a trusted interface 916. The device 118 can also include, in some embodiments, a user interface 904. The SE 110 can include a profile 116. The profile 116 can include an ISD-P 922. An ISD-P (issuer security domain-profile) can host a unique profile within an eUICC. The ISD-P is a secure container or security domain for the hosting of the profile. The ISD-P is used for profile download and installation based on a received bound profile package. The profile 116 can also include an MNO-SD 924. An MNO-SD is the representative on the SE 110 of an MNO providing services to an end user of the device 118 (for example, MNO 910). The profile 116 can also include a file system 926 and a CASD or key store 930. Also illustrated are memory 312 and ECASD 314.

Exemplary Network System

Figure 10:
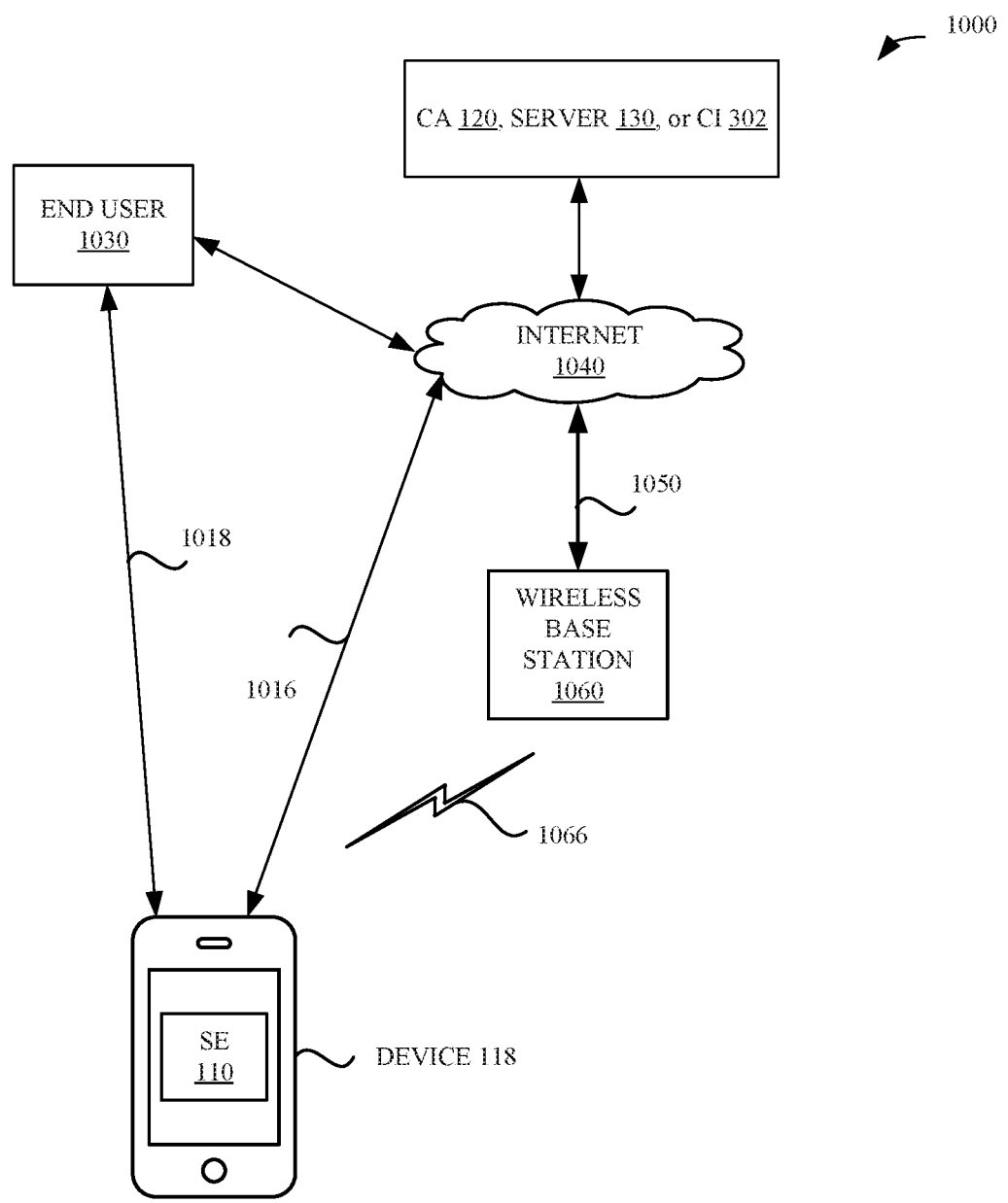
FIG. 10 illustrates an exemplary network system including an SE in a device, according to some embodiments.

FIG. 10 illustrates an exemplary network system 1000. The SE 110 in the device 118 can be in communication with i) an end user 1030 through interface or connection 1018, with ii) the Internet 1040 through a wired connection 1016, and with iii) a wireless base station 1060 through a radio connection 1066. Wireless base station 1060 is able to communicate through the Internet 1040 as shown by connection 1050. The CA 120, the server 130, and/or the CI 302, for example, can communicate with the SE 110 through the Internet 1040.

Representative Exemplary Apparatus

Figure 11:
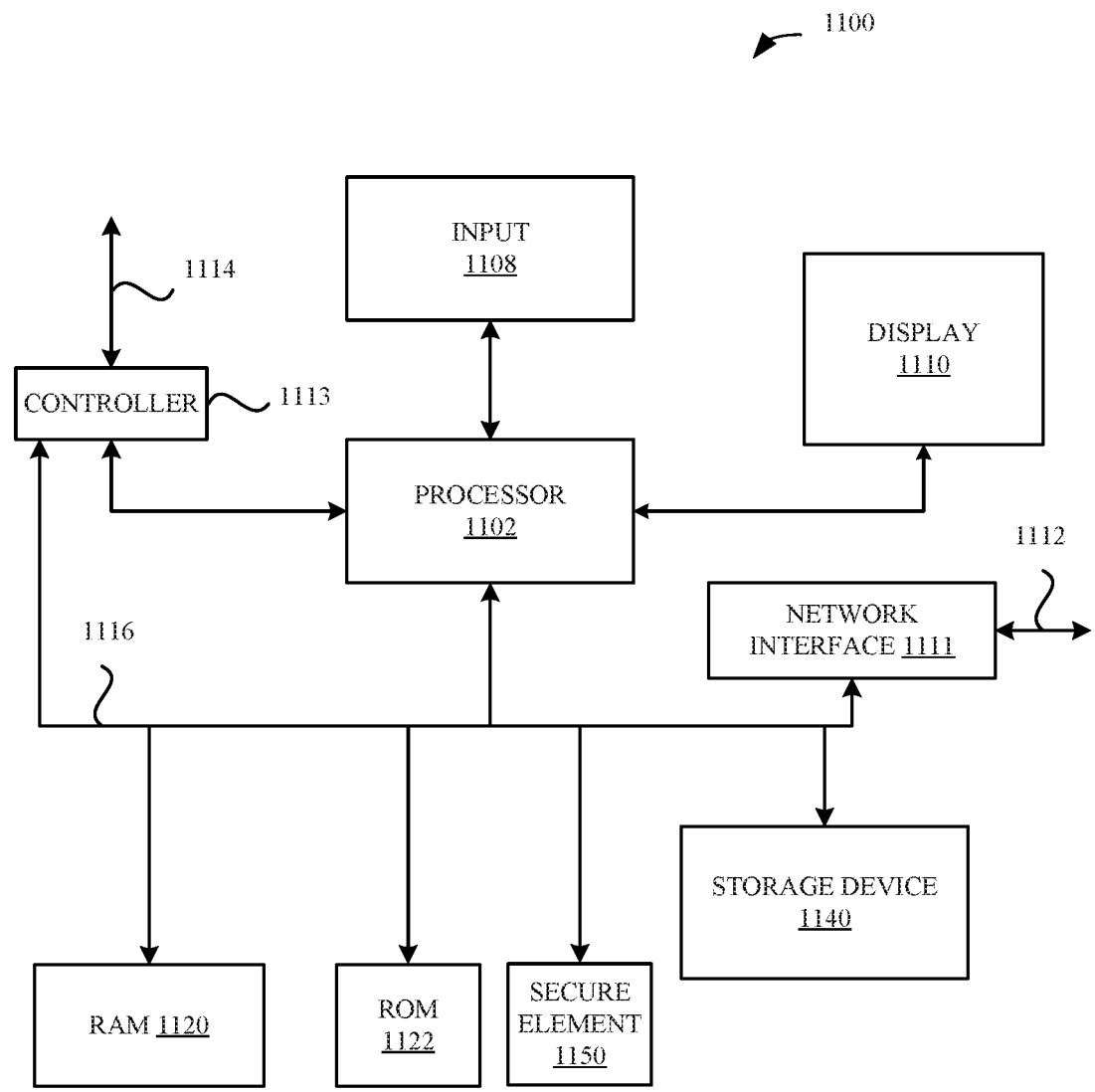
FIG. 11 illustrates an exemplary apparatus for implementation of the embodiments disclosed herein.

FIG. 11 illustrates in block diagram format an exemplary computing device 1100 that can be used to implement the various components and techniques described herein, according to some embodiments. In particular, the detailed view of the exemplary computing device 1100 illustrates various components that can be included in the device 118, the SE 110 and the servers, CAs, CIs and network entities illustrated in one or more of FIGS. 1, 3, 4A-4C, 5-6, 9-10, 12, 13A, 14A, and 15A. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user (for example, information relating to incoming, outgoing, or active communication session). A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include wireless circuitry, such as a wireless transceiver and/or baseband processor.

The computing device 1100 also includes a storage device 1140, which can include a single storage or a plurality of storages (e.g., hard drives), and includes a storage management module that manages one or more partitions within the storage device 1140. In some embodiments, storage device 1140 can include flash memory, semiconductor (solid state) memory or the like. The computing device 1100 can also include an SE 1150. The computing device 1100 can also include a Random Access Memory ("RAM") 1120 and a Read-Only Memory ("ROM") 1122. The ROM 1122 can store programs, utilities or processes to be executed in a non-volatile manner. The RAM 1120 can provide volatile data storage, and stores instructions related to the operation of the computing device 1100.

Multi-Check Architecture

A trusted chain of multiple trusted sources is provided herein to defeat malicious actors. A device may rely on the global positioning system (GPS) for time values. Network servers often rely on NTP (RFC 5905) for time values. If there is a single point of time reference (either a server or device) a malicious actor may seek to modify the timestamp before it reaches the secure element (SE). The tampering of the malicious actor can be mitigated by having more than one party check the time value as it makes its way to the SE. The multiple time value checkers make up what is called herein a multi-check architecture.

Three exemplary scenarios of a multi-check architecture are provided herein. In the first scenario, two different servers with a common root of trust check a time value as the time value makes its way from a network time source to the SE. In a second scenario, several entities check the time value and the entities are provided with PKI private key-public key pairs, where the respective public keys are in PKI certificates signed by certificate authorities (CAs) that have different roots of trust. In the third scenario, a blockchain network arrangement is used. The blockchain network arrangement relies on distributed transaction verification.

Figure 12:
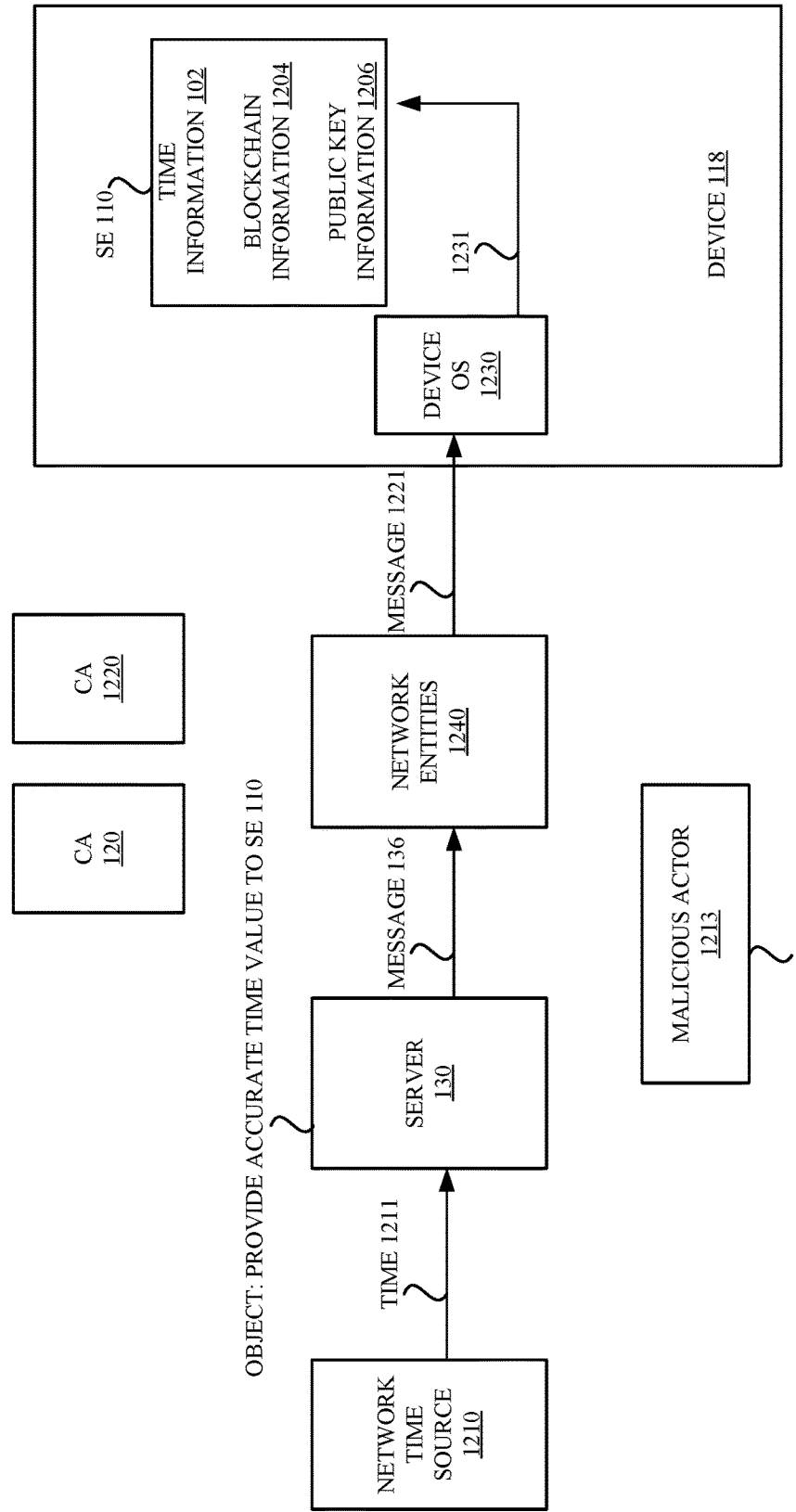
FIG. 12 illustrates an exemplary multi-check architecture, according to some embodiments.

FIG. 12 illustrates a multi-check architecture 1200 and a malicious actor 1213. The objective is for the server 130 to provide an accurate time value to the SE 110. An accurate time value helps the SE 110 recognize when stored certificates have become expired. The malicious actor 1213 wants to corrupt the time information 102 in the SE 110. For instance, in a denial of service attack, making the SE 110 inoperable would deny service to the device 118. Moving the time information 102 to a value far in the future, by the malicious actor 1213, would indicate to the SE 110 that the current time was later than expiration times of typical certificates on the SE 110. This could cause the SE 110 to mistakenly view all of its certificates as expired. Then, secure communication to the SE 110 would become very difficult because every public key trusted by the SE 110 would become untrusted.

The basic multi-check architecture includes a network time source 1210, the server 130, one or more network entities 1220 and the device 118 housing the SE 110. CA 120 and CA 1220 may or may not be present. Malicious actor 1213 is a threat that the multi-check architecture guards against. Within the SE 110 is time information 102. Also within the SE 110 is blockchain (BC) information 1204 and/or public key information 1206. The device 118 has an operating system (OS) 1230.

The overall flow of time value in FIG. 12 is as follows. The server 130 receives time 1211 from the network time source 1210. The network time source 1210 may be an NTP time reference. In some embodiments, the time 1211 is an actual time or it is a counter type time value, as described above. The server 130 performs a local check of the time and sends the time in a message 136 to the network entities 1220. The network entities 1220 send the received time value to the device 118 in a message 1221. The device OS 1230 checks the received time value and passes it to the SE 110. The SE 110 checks the received time value and updates the time information 102. The SE 110 then performs security material clean up as needed as described above.

If any of the server 130, the network entities 1220, the device OS 1230 or the SE 110 detects a problem with the particular time value that it receives, the time value is not used and the time information 102 will remain unchanged. Thus, a malicious actor 1213 tampering with, for example, the message 136 will be unable to influence the time information 102.

Various embodiments of this multi-check architecture 1200 are given in scenarios 1, 2, and 3 described below.

Multi-Check Architecture, Scenario 1

Figure 13A:
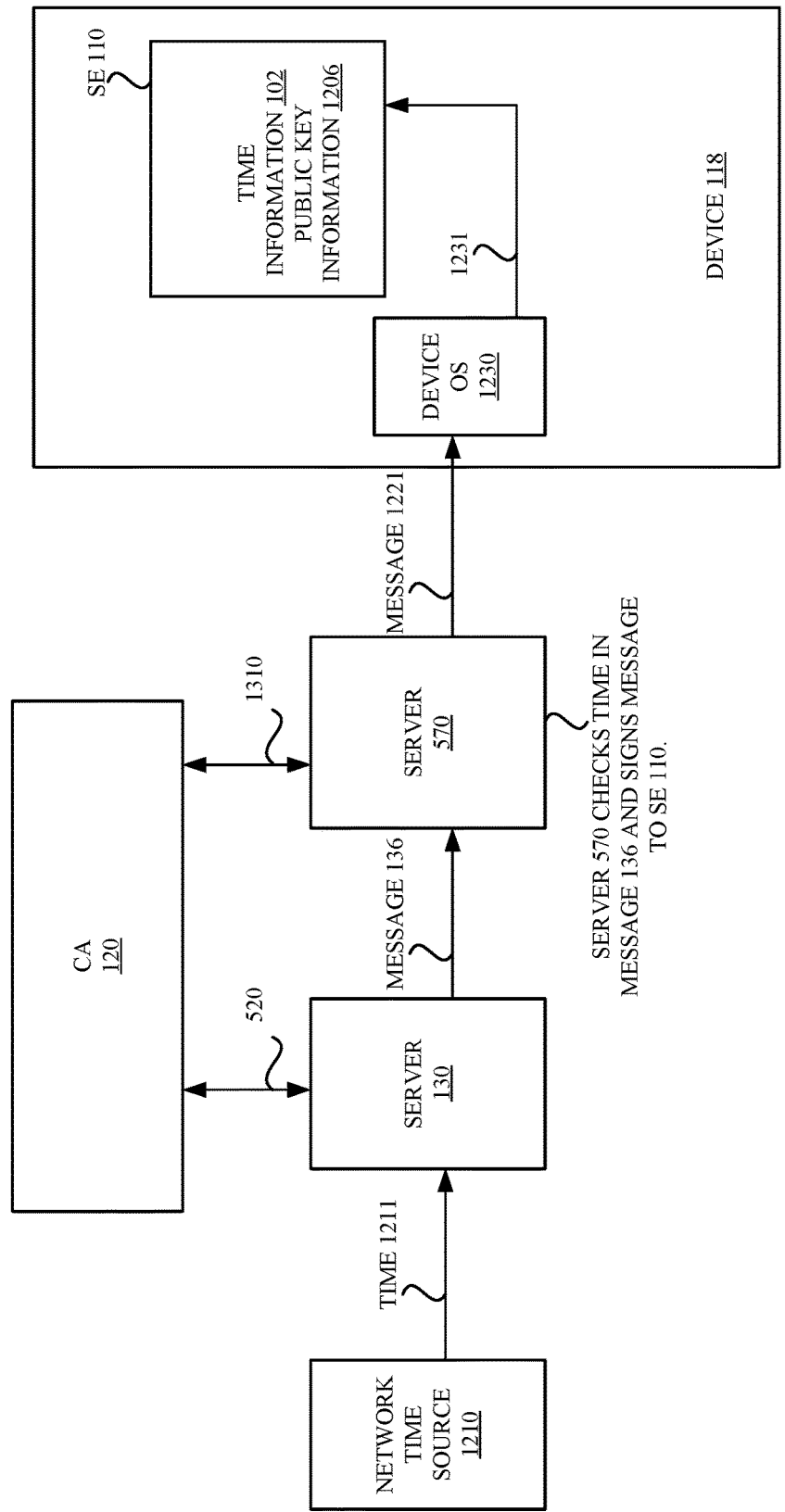
FIG. 13A illustrates a first exemplary scenario of the exemplary multi-check architecture in which two servers uses certificates signed by a common root authority, according to some embodiments.

FIG. 13A illustrates an exemplary system 1300 for performing multiple checks on a time value as the time value makes its way from the network time source 1210 to the SE 110. FIG. 13A illustrates servers 130 and 530, but in general there may be more than two servers. Server 130 checks the received time 1211 according to server 130 policy. For example, the server 130 access a local time value, $T_{S1}$, and compares this with the received time 1211.

A variety of policy rules are provided herein. In one rule, the server 130 checks whether the received time, here time 1211, is less than or equal to a local time, here $T_{S1}$. If the time 1211 is less than or equal to $T_{S1}$, then the time value is acceptable (the rule requires that time $1211 \leq T_{S1}$). This rule may be referred to as the Rule of the Past. In a second rule, the server 130 requires that the received time be less than the local time $T_{S1}$, but still be within a security window. In some embodiments, the security window defines a time interval with the beginning of the interval being $T_{S1}-\Delta$ and the end of the interval being $T_{S1}$. Here, the duration of the security window is indicated as $\Delta$. Denote the time 1211 as $T_R$. $T_R$ is a dummy variable; its meaning depends on the context it is used in. Symbolically, this rule requires that $T_R \in [T_{Local}-\Delta, T_{Local}]$ with $T_{Local}$ taking the value $T_{S1}$ at server S1. Here, the security window has been written as a closed interval with square brackets: "[" and "]". Alternatively, the security window may be open or semi-closed. The second rule is referred to herein as the Rule of the Window.

The server 130 cryptographically signs, using its private key 134 (see FIG. 1), a payload including the time 1211 to create the message 136. The message 136 is then sent toward the SE 110 and reaches the server 530. The public key 132 corresponds to the private key 134. The public key 132 is distributed by the server 130 using the certificate 122 signed over by the CA 120.

The server 530 then checks the time it received from the server 130. If there was no tampering, the received time is the time 1211, but if there is tampering, the received time at the server 530 is generally different than the time 1211. A skeptical recipient of a time value may call the received time value $T_R$, and then check $T_R$. The server 530 checks the received time, thus denoted here as $T_R$, according to its policy, using, for example, either the Rule of the Past or the Rule of the Window. The server 530 uses its own version of local time, $T_{S2}$, to evaluate $T_R$ ($T_R$ is here the time that arrived in the message 136) in the rule dictated by the policy of the server 530. If $T_R$ satisfies the test applied by the server 530, then the server 530 creates the message 1221 by signing over a payload including the value $T_R$ and sending the resulting message 1221 to SE 110 via the device 118. The server 530 has a private key-public key pair, and the server 530 distributes its public key using a certificate signed over by the CA 120. The delivery of this signed certificate, which happens some time prior to the time events described in FIG. 13A, to the server 530 is by the connection 1310.

The device OS 1230 receives the message 1221 and parses from it a time value, here denoted $T_R$. The malicious actor 1213 may have corrupted the message 1221, so the $T_R$ observed by the device 118 may not be the same as the time value sent by the server 530. The device OS 1230 then applies a check to $T_R$ using the Rule of the Past or the Rule of the Window using a local time value $T_D$. In some embodiments, the device OS 1230 presents an indication on the user interface 904 representing the value of $T_R$ and a query to the user asking if the value of $T_R$ is acceptable and/or should be provided to the SE 110. If the user rejects the value of $T_R$, then processing of the message 1221 stops and the value of $T_R$ is not sent to the SE 110.

If none of the server 130, the server 530 or the device OS 1230 have discarded the time value that they received, then a time value will be sent as shown by the arrow 1231 from the device OS 1230 to the SE 110. The SE 110 then authenticates signatures similarly to the operations shown in FIGS. 2, 7, and 8 above. Public key information 1206 provides public keys for each private key used (the private keys of servers 130 and 530). If the signatures are successfully verified, then the time information 102 is updated using the value of $T_R$ associated with the communication 1231.

Scenario 1 Logic

Figure 13B:
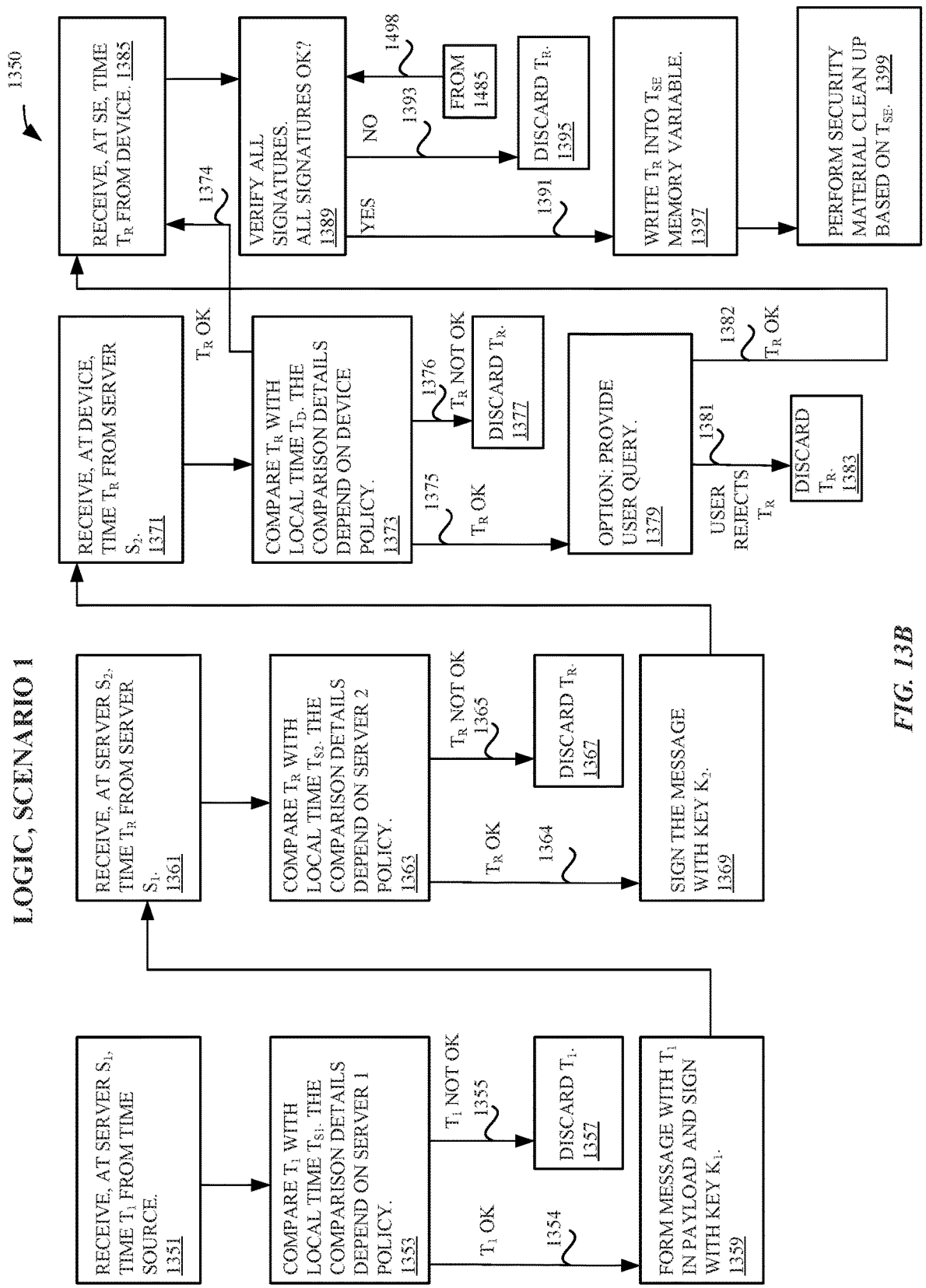
FIG. 13B illustrates exemplary logic corresponding to the first exemplary scenario of the exemplary multi-check architecture, according to some embodiments.

FIG. 13B provides exemplary logic 1350 for scenario 1 in which a time value is sent toward an SE. At 1351, a server $S_1$ receives a time $T_1$ from a time source. The logic then flows to 1353 and the server $S_1$ applies a rule such as the Rule of the Past or the Rule of the Window using local time $T_{S1}$. If the time check fails the applied rule, then the logic flows via 1355 to 1357 and $T_1$ is discarded and no message is sent onward to the SE. Otherwise, the logic flows via 1354 to 1359 where a message is formed with $T_1$ in the payload. The message is signed over with a private key $K_1$ for which the SE has the corresponding public key. The signed message is sent toward the SE and arrives, at 1361, at a server $S_2$.

Server $S_2$ then parses a time value out of the signed message, call it $T_R$, at 1363, and applies the Rule of the Past or the Rule of the Window to the value $T_R$ using its local time $T_{S2}$. If $T_R$ fails the rule check, the logic flows via 1365 to 1367 and $T_R$ is discarded. However, if the applied rule is satisfied, the logic passes via 1364 to 1369 and the server $S_2$ signs over the message or the payload of the message with its own private key $K_2$. The logic then flows to 1371 at which point the device housing the SE receives the message signed by server $S_2$.

The device parses a time value from the payload, call it $T_R$. The device then, at 1373, compares $T_R$ to local device time $T_D$ using the Rule of the Past or the Rule of the Window. If $T_R$ fails the check, then the logic flows via 1376 to 1377 and $T_R$ is discarded. However, if $T_R$ satisfies the check, processing continues. The device may query a user of the device to see if the value $T_R$ should be sent to the SE; this is shown by the path 1375 and the query step 1379. If the user rejects $T_R$, the logic flows via 1381 to 1383 and $T_R$ is discarded by the device. If the query is not performed, the logic flows via 1374 to 1385. If the query is performed and the user approves of $T_R$, the logic flows via 1382 to 1385.

At 1385, the SE receives a time value, call it $T_R$, from the device over a device-SE interface. The SE is the final recipient of the time value. The SE obtains confidence in the time value by checking all of the signatures applied. Thus, the SE checks the signatures of each server, in this example, the signatures of $S_1$ and $S_2$. Verifying signatures is a well-known PKI activity based on the SE having available the public keys of each signing server. The SE may store these keys or may request them by obtaining a PKI certificate for the given server for which the SE does not have a copy of the public key.

If any signature fails verification, then the logic flows via 1393 to 1395 and the value $T_R$ is discarded by the SE. If all of the signatures are verified, the logic flows via 1391 to 1397 and a time memory variable $T_{SE}$ in the SE is updated to now hold the value $T_R$ received by the SE from the device.

Based on a schedule or based on a triggering event, the SE will perform a security material clean up at 1399 as described above with respect to, e.g., FIG. 7, using the time value $T_{SE}$.

Multi-Check Architecture, Scenario 2

Figure 14A:
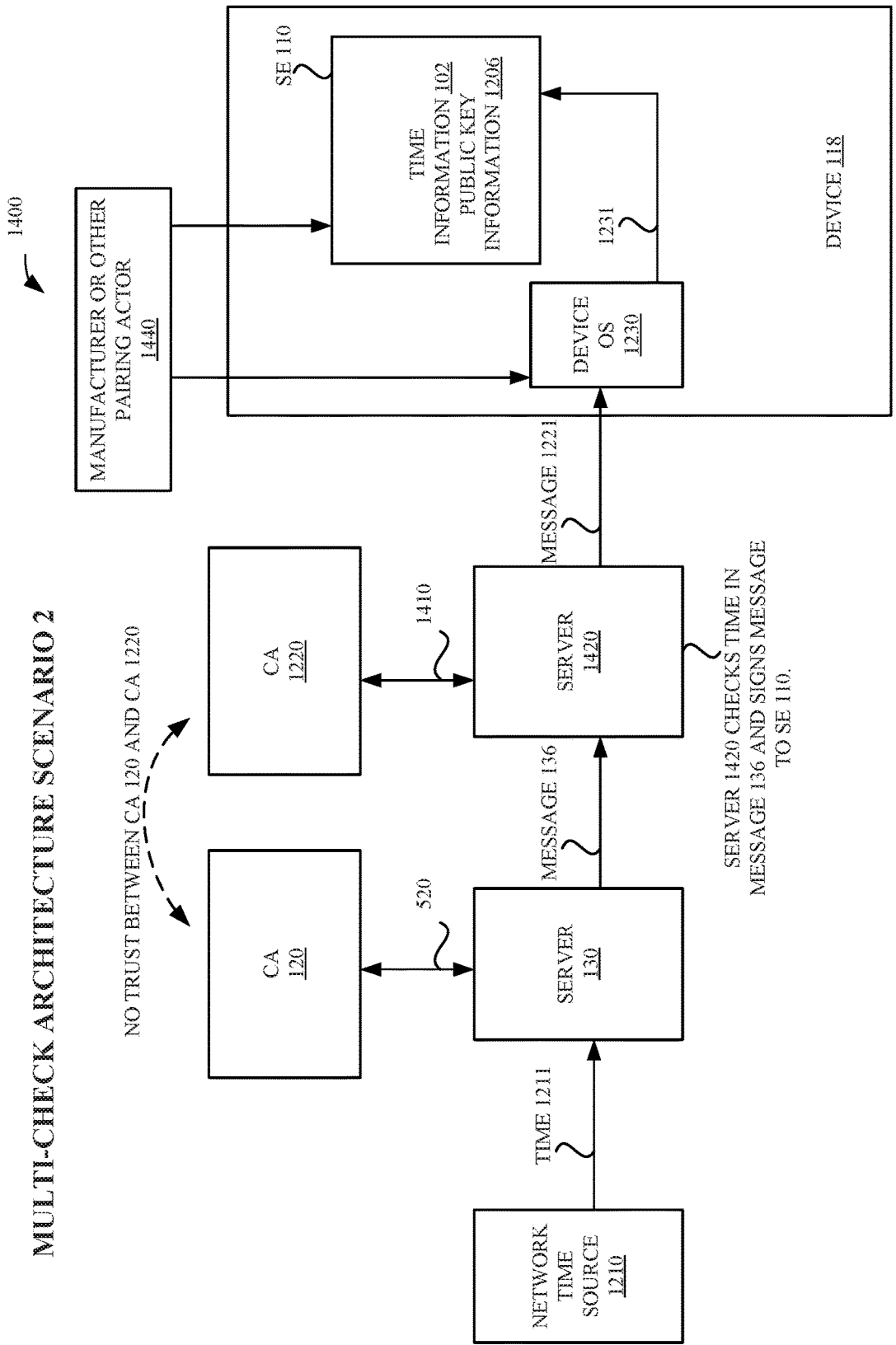
FIG. 14A illustrates a second exemplary scenario of the exemplary multi-check architecture in which two servers use respective certificates not signed by a common root authority, according to some embodiments.

FIG. 14A shows an exemplary system 1400 which is an embodiment of the multi-check architecture 1200 shown in FIG. 12. System 1400 of FIG. 14A has several features in common with system 1300 of FIG. 13A. However, in FIG.

14A, there is a second CA, CA 1220. CA 120 and CA 1220 have different roots of trust so there is no trust relationship between CA 120 and CA 1220. The PKI certificate of server 1420 is signed by CA 1220 and may be communicated to server 1420 via path 1410.

The device 118 in the system 1400 has a PKI signing capability. The certificate of the device 118 holding the public key corresponds to the private key of the device 118. This certificate is provided to the SE 110 by a pairing actor 1440. The pairing actor 1440, in some embodiments, is associated with the manufacturer of the device 118 or with the manufacturer of the SE 110.

Server 1420 behaves in a similar way to the server 530 of the system 1300, with the distinction regarding different root of trust.

The device 118 in the system 1400 operates in a similar way to the device 118 in the system 1300, with the addition of performing a signing function when the device OS 1230 determines that a received time in the message 1221 is acceptable.

The SE 110 in the system 1400 operates in a similar way to the SE 110 in the system 1300, with the addition of now also having a public key for the device and checking a device signature before adopting a time value received from the device over the device-SE interface 1231.

Logic, Scenario 2

Figure 14B:
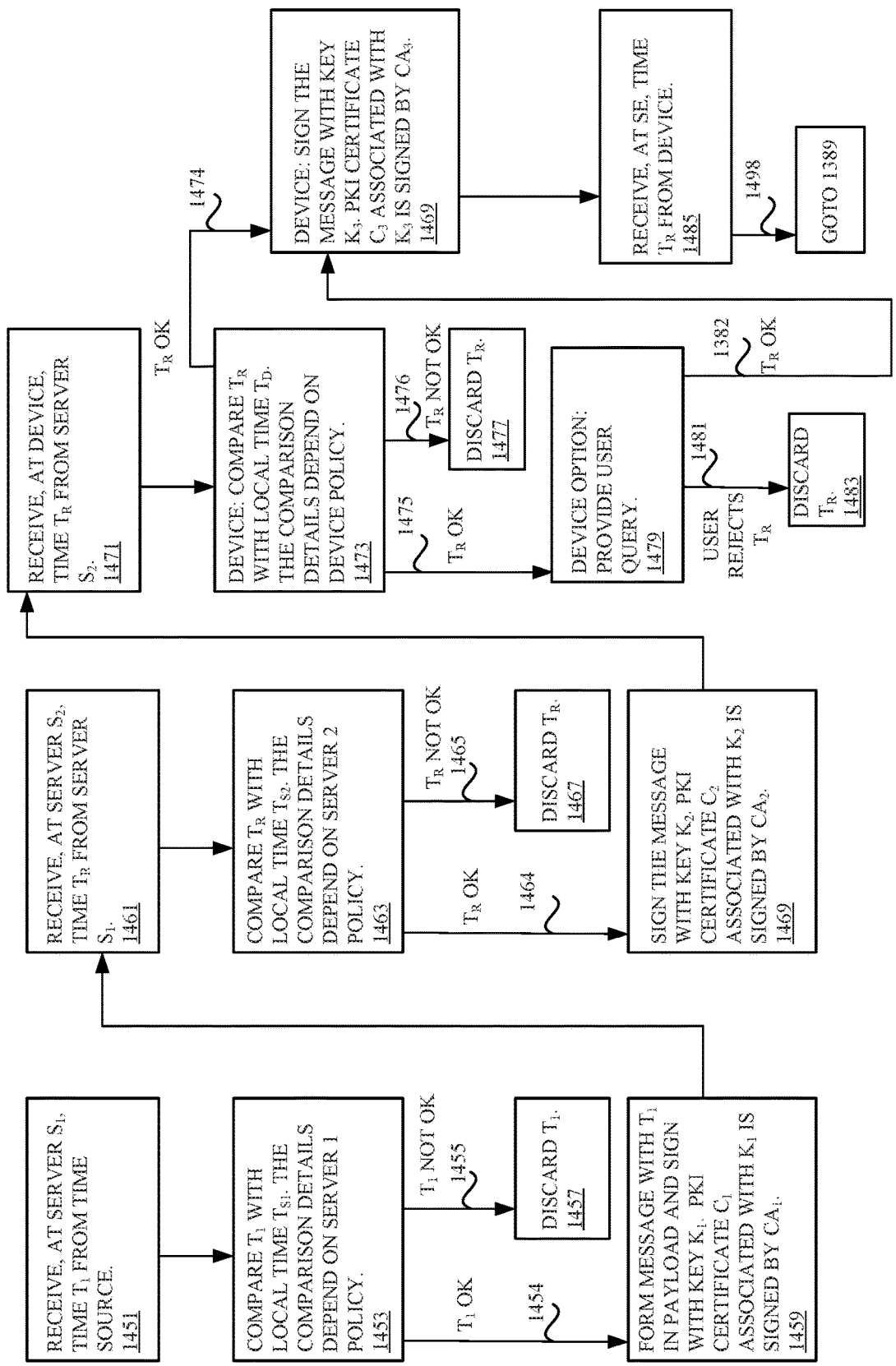
FIG. 14B illustrates exemplary logic corresponding to the second exemplary scenario of the exemplary multi-check architecture, according to some embodiments.

FIG. 14B provides logic 1450 for scenario 2 performed in the system 1400, in which a time value is sent by a server $S_1$ toward an SE. At 1451, the server $S_1$ receives a time $T_1$ from a time source. The logic then flows to 1453 and the server $S_1$ applies a rule such as the Rule of the Past or the Rule of the Window using local time $T_{S1}$. If the time check fails the applied rule, then the logic flows via 1455 to 1457 and $T_1$ is discarded and no message is sent onward to the SE. Otherwise, the logic flows via 1454 to 1459 where a message is formed with $T_1$ in the payload. The message is signed over with a private key $K_1$ for which the SE has the corresponding public key. A PKI certificate $C_1$ bearing the public key corresponding to $K_1$ is signed by a certificate authority $CA_1$. The signed message is sent toward the SE and arrives, at 1461, at a server $S_2$.

Server $S_2$ then parses a time value out of the signed message, call it $T_R$, at 1463, and applies the Rule of the Past or the Rule of the Window to the value $T_R$ using its local time $T_{S2}$. If $T_R$ fails the rule check, the logic flows via 1465 to 1467 and $T_R$ is discarded. However, if the applied rule is satisfied, the logic passes via 1464 to 1469 and the server $S_2$ signs over the message or the payload of the message with its own private key $K_2$. A PKI certificate $C_2$ bearing the public key corresponding to $K_2$ is signed by a certificate authority $CA_2$.

$CA_1$ and $CA_2$ have different roots of trust. This provides robustness. Suppose a certificate issuer $CI_1$ is the root of trust for $CA_1$ and a certificate issuer $CI_2$ is the root of trust for $CA_2$. If $CI_1$ is hacked and generates a bogus value of $K_1$ with a corresponding certificate signed with the private key of $CI_1$, any altered value of time sent to $S_2$ purporting to be from $S_1$ can still be detected at $S_2$. $K_2$ is not compromised by the same hack on $CI_1$ because the root of trust for $C_2$ is $CI_2$.

The logic flows from 1469 to 1471 at which point the device housing the SE receives the message signed by server $S_2$. The device parses a time value from the payload, call it $T_R$. The device then, at 1473, compares $T_R$ to local device time $T_D$ using the Rule of the Past or the Rule of the Window. If $T_R$ fails the check, then the logic flows via 1476 to 1477 and $T_R$ is discarded. However, if $T_R$ satisfies the check, processing continues. The device may query a user of the device to see if the value $T_R$ should be sent to the SE, this is shown by the path 1475 and the query step 1479. If the user rejects $T_R$, the logic flows via 1481 to 1483 and $T_R$ is discarded by the device. If the query is not performed, the logic flows via 1474 to 1485. If the query is performed and the user approves of $T_R$, the logic flows via 1482 to 1469.

At 1469, the device signs the message with a key $K_3$. A PKI certificate $C_3$ associated with $K_3$ is signed by a $CA_3$. The SE has received $C_3$ from a pairing actor previously (see the discussion of FIG. 14A). At 1485, the SE receives a time value, call it $T_R$, from the device over a device-SE interface. The remaining operations are the same as in FIG. 13B and so FIG. 14B shows that the logic flows from 1485 via 1498 to 1389. In brief, the SE checks all signatures and if any signature fails verification, then the value $T_R$ received at the SE is discarded by the SE. If all of the signatures are verified a time memory variable $T_{SE}$ in the SE is updated to now hold the value $T_R$ received by the SE from the device. Based on a schedule or based on a triggering event, the SE will perform a security material clean up as described above with respect to, e.g., FIG. 7, using the time value $T_{SE}$.

Multi-Check Architecture, Scenario 3

Figure 15A:
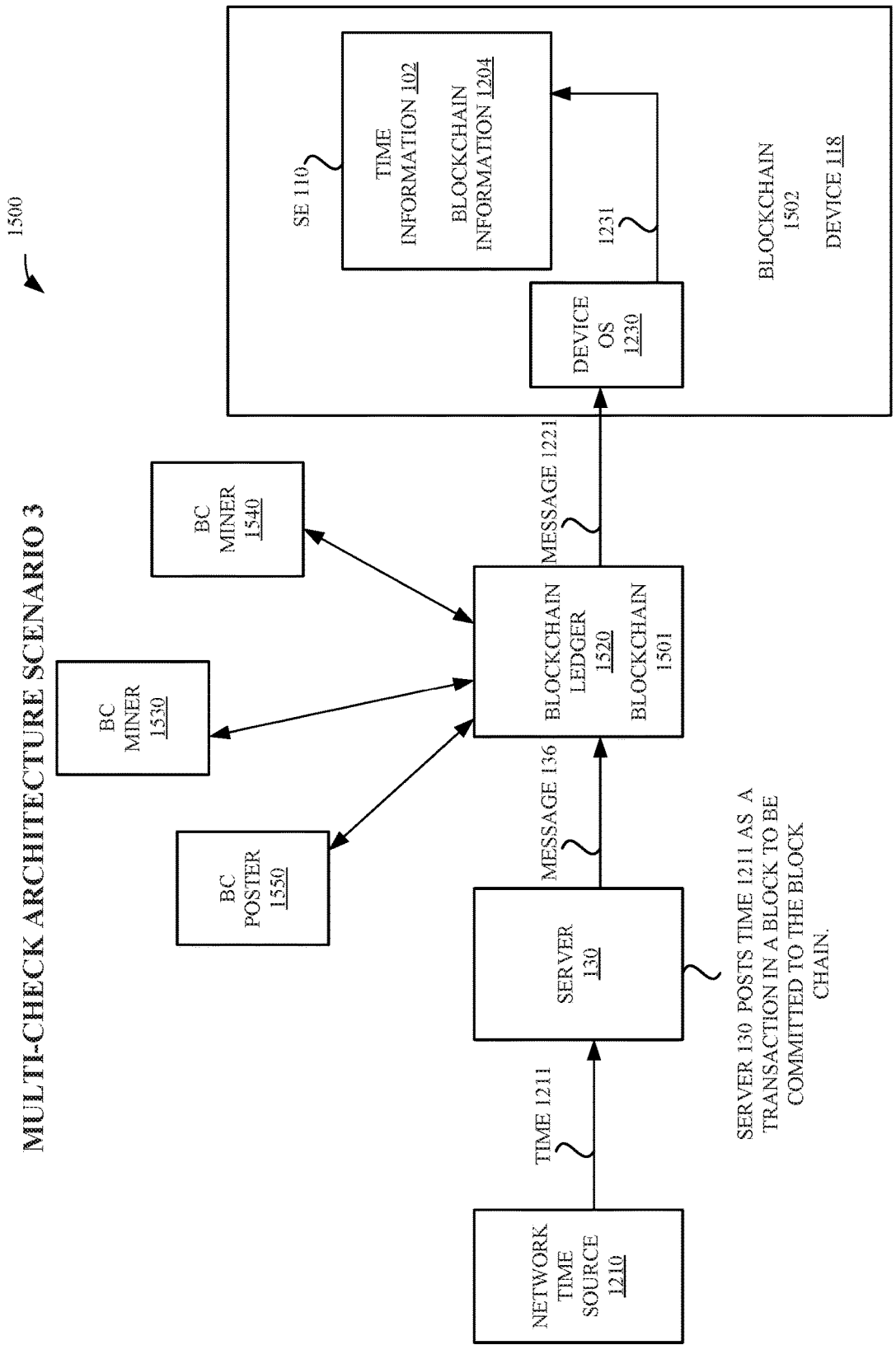
FIG. 15A illustrates a third exemplary scenario of the exemplary multi-check architecture in which a blockchain technique is used, according to some embodiments.

FIG. 15A shows an exemplary system 1500, which is based on a publicly-visible blockchain. The basics of blockchain formation will be described with respect to FIG. 15B below. Instead of downstream servers repeatedly checking and signing over a time value as the time value makes its way to the SE, the first server posts the time value as a transaction to be placed in a block. A miner commits the block, and then tampering with the committed block becomes infeasible for the malicious actor 1213. When the block containing the time value reaches the SE, the SE performs block verification and then consumes the time value if the verification succeeds.

Figure 15B:
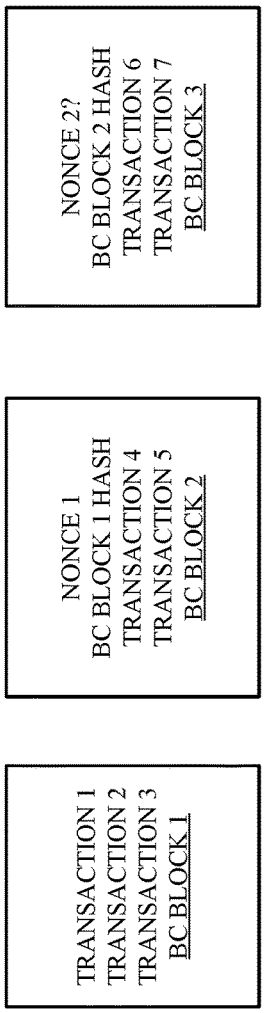
FIG. 15B illustrates exemplary details of how a blockchain is grown.
Figure 15C:
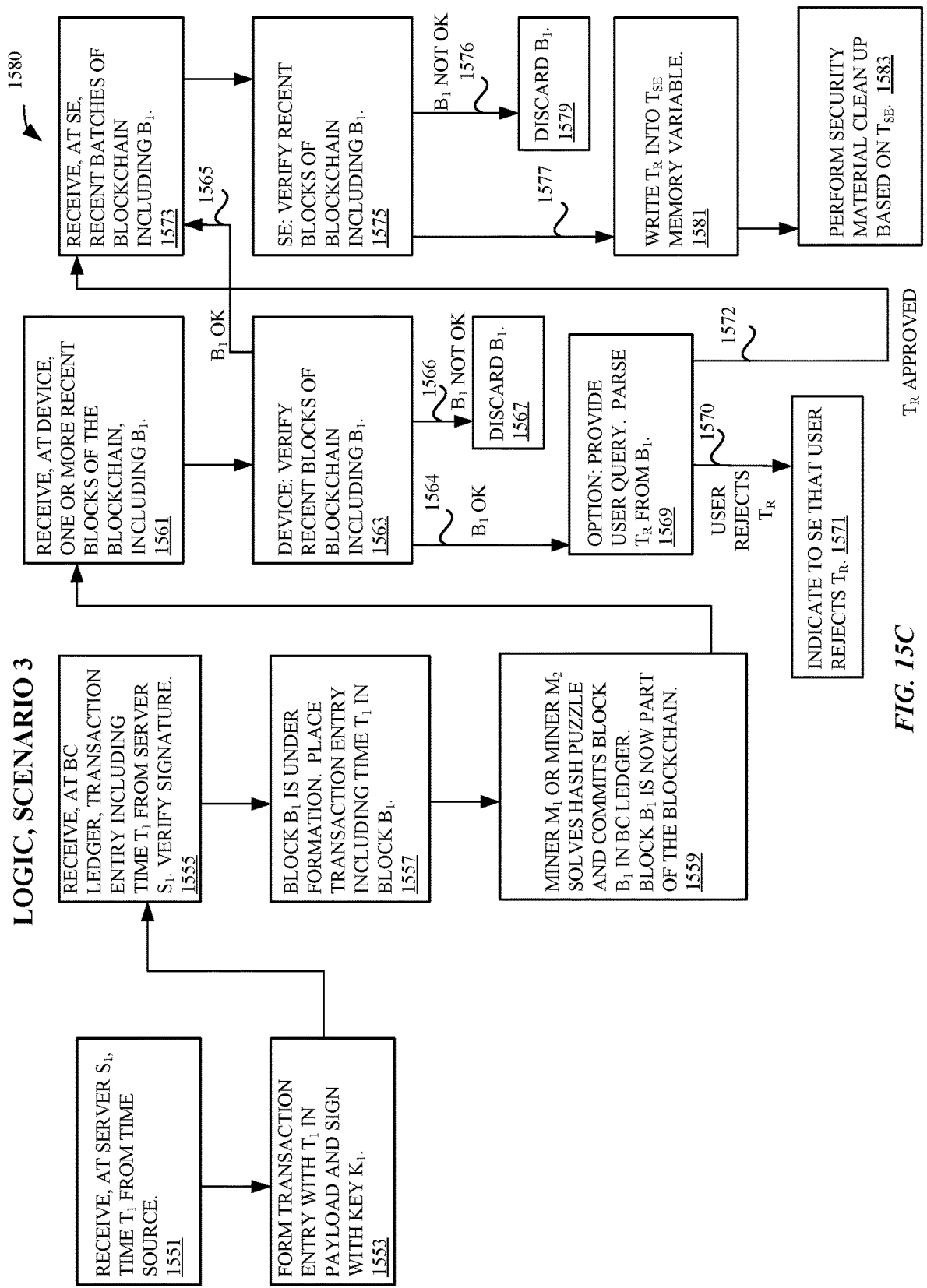
FIG. 15C illustrates exemplary logic corresponding to the third exemplary scenario of the exemplary multi-check architecture, according to some embodiments.

An exemplary embodiment is provided in FIG. 15A with corresponding logic in FIG. 15C. Blockchain ledger 1520 has a copy of a blockchain 1501 and the blockchain 1501 is public. Anyone may receive a copy of the blockchain 1501 from the blockchain ledger 1520. The blockchain 1501 is continually growing as transactions are posted into blocks and blocks are committed to the blockchain 1501.

The server 130 receives time 1211 from the network time source 1210. The server 130 posts the time 1211 in a message 136 as a transaction in a block to be committed to the blockchain 1501. Other transactions may be posted by another server, e.g., BC poster 1550. BC miners 1530 and 1540 attempt to solve the hash puzzle associated with the new block to be committed to the blockchain 1501. One of the miners finds the nonce to solve the hash puzzle for the new block containing the time 1211 and the block is committed to the blockchain 1501.

The device 118 has a copy of the blockchain 1502. In general, the blockchain 1502 may not have the newest blocks that are present in the blockchain 1501. The device 118 receives the newest blocks in one or more messages 1221 including a block holding a time value for the SE. In general, the device 118 will suppose that the received time is to be verified by verifying the block that it arrives in. After the device 118 verifies the block (and any unverified previous blocks), the device 118 begins supplying blocks in batches to the SE 110.

The SE 110 has blockchain information 1204. The SE 110 may not have sufficient memory to store the blockchain 1501. In some embodiments, the SE 110 maintains a hash value of a past block and rebuilds the blockchain from that previous block to the most recent block sent by the device 118.

In some instances, an SE 110 may have no blockchain information 1204 and starts with a recent block and verifies that recent block. The SE 110 then continuously requests a next earlier block and verifies it until the SE 110 has verified the entire blockchain 1501 (other than any new committed blocks that occur during the verification).

In some instances, a trusted party provides blockchain status information to the SE 110 such as a hash value of a properly committed previous block ("block N") and the SE 110 only then needs to verify the blocks that occur after block N.

Blockchain Details

FIG. 15B illustrates exemplary blockchain details 1540. On the left is a blockchain (BC) block 1. BC block 1 documents transactions 1, 2, and 3. A hash over BC block 1 produces BC block 1 hash, which is part of the content of BC block 2. Also part of BC block 2 are transactions 4 and 5. A nonce, here called nonce 1, solves the hash puzzle for BC block 2 and BC block 2 is already committed as part of the blockchain. In FIG. 15B, transactions 6 and 7 have been posted and miners are searching for a value to solve the hash puzzle for BC block 3. When the hash puzzle is solved, the successful miner will provide the value of nonce 2 which solves the hash puzzle for BC block 3. BC block 3 will then be committed to the blockchain.

Logic, Scenario 2

FIG. 15C provides logic 1550 for scenario 3 performed in the system 1500, in which a time value is sent by a server $S_1$ toward an SE using a blockchain.

At 1551, a server $S_1$ receives a time $T_1$ from a time source. $S_1$ forms a transaction entry at 1553 including the time $T_1$ in a payload and signs over the payload with a key $K_1$. The payload and signature is sent to a BC ledger where the signature is verified at 1555.

The logic then flows to 1557 and the BC ledger places the transaction entry including $T_1$ in a block $B_1$ which is under formation. The logic then flows to 1559 and miners $M_1$ and $M_2$ attempt to solve the hash puzzle based on $B_1$. Some miner solves the puzzle and the block $B_1$ is committed to the blockchain.

The logic then flows to 1561 and the device receives one or more recent blocks of the blockchain, including $B_1$. At 1563, the device attempts to verify recent blocks of the blockchain including $B_1$. If $B_1$ fails verification, then the logic flows via 1566 to 1567 and $B_1$ is discarded. However, if $B_1$ is verified, then the logic flows via 1564 to 1569 (if the device queries a user) or else via 1565 to 1573 (if the device does not query a user). At 1569, the device queries the user whether a time $T_R$ parsed from $B_1$ is approved by the user. If the user rejects $T_R$, then the logic flows via 1570 to 1571 and the device indicates to the SE that the value $T_R$ is rejected by the user. If the user approves $T_R$, the logic flows via 1572 to 1573. In any case, a successfully verified $B_1$ will be sent to the SE so that the SE can maintain fresh blockchain information.

At 1573, the SE receives batches of blocks of the blockchain including $B_1$. At 1575, the SE verifies the blocks batch by batch. This includes attempting to verify $B_1$. If $B_1$ fails verification, the logic flows by 1576 to 1579 and $B_1$ is discarded. Otherwise, $B_1$ has been verified in 1575 and the logic flows via 1577 to 1581. The SE parses a time value $T_R$ from the block $B_1$ and writes $T_R$ into a $T_{SE}$ memory variable. At some time, as in for example FIG. 7, the SE then performs a security material cleanup based on $T_{SE}$ at 1581.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device comprising:
   a secure element (SE);
   wireless circuitry; and
   a processor communicatively coupled to the SE, the wireless circuitry, and a memory storing instructions, that when executed by the processor, cause the device to perform operations comprising:
   receiving a blockchain (BC) block from a BC ledger, wherein the BC block includes a second hash value and a time value,
   when a content of the BC block and a BC state value are not consistent with a first hash value stored in the memory:
   discarding the BC block, and
   when the content of the BC block and the BC state value are consistent with the first hash value stored in the memory:
   replacing, in the memory, the first hash value with the second hash value,
   parsing the time value from the BC block,
   providing a first indication of the time value on a user interface of the device,
   receiving a second indication from the user interface,
   when the second indication indicates that the time value is rejected:
   sending, to the SE, a message indicating that the time value in the BC block is rejected; and
   when the second indication indicates that the time value is not rejected:
   sending, to the SE, the BC block and a message indicating that the time value in the BC block is not rejected.

2. The device of claim 1, wherein the operations further comprise:
   obtaining a plurality of BC blocks;
   verifying each BC block in the plurality of BC blocks;
   dividing the plurality of BC blocks into a plurality of batches; and
   when the second indication indicates that the time value is not rejected:

sending a first batch of the plurality of batches to the SE, wherein a size of the first batch is chosen to not exceed a memory capacity of the SE.

3. The device of claim 2, wherein the plurality of batches is ordered in time such that the plurality of batches includes a most recent batch in time.

4. The device of claim 3, wherein the first batch is the most recent batch in time.

5. The device of claim 3, wherein the first batch is not the most recent batch in time.

6. The device of claim 1, wherein the time value originates from a network time source.

7. The device of claim 1, wherein the time value is posted by a network server as a transaction for placement in the BC block.

8. An apparatus configurable for operation in a device, the apparatus comprising:
    a processor; and
    a memory storing instructions, that when executed by the processor, cause the device to perform operations comprising:
        receiving a blockchain (BC) block from a BC ledger, wherein the BC block includes a second hash value and a time value,
        when a content of the BC block and a BC state value are not consistent with a first hash value stored in the memory:
            discarding the BC block, and
        when the content of the BC block and the BC state value are consistent with the first hash value stored in the memory:
            replacing, in the memory, the first hash value with the second hash value,
            parsing the time value from the BC block,
            providing a first indication of the time value on a user interface of the device,
            receiving a second indication from the user interface,
            when the second indication indicates that the time value is rejected:
                sending, to a secure element (SE) housed in the device, a message indicating that the time value in the BC block is rejected;
            when the second indication indicates that the time value is not rejected:
                sending, to the SE, the BC block and a message indicating that the time value in the BC block is not rejected.

9. The apparatus of claim 8, wherein the operations further comprise:
    obtaining a plurality of BC blocks;
    verifying each BC block in the plurality of BC blocks;
    dividing the plurality of BC blocks into a plurality of batches; and
    when the second indication indicates that the time value is not rejected:
        sending a first batch of the plurality of batches to the SE, wherein a size of the first batch is chosen to not exceed a memory capacity of the SE.

10. The apparatus of claim 9, wherein the plurality of batches is ordered in time such that the plurality of batches includes a most recent batch in time.

11. The apparatus of claim 10, wherein the first batch is the most recent batch in time.

12. The apparatus of claim 10, wherein the first batch is not the most recent batch in time.

13. The apparatus of claim 8, wherein the time value originates from a network time source.

14. The apparatus of claim 8, wherein the time value is posted by a network server as a transaction for placement in the BC block.

15. A method performed by a device, the method comprising:
    by the device:
        receiving a blockchain (BC) block from a BC ledger, wherein the BC block includes a second hash value and a time value,
        when a content of the BC block and a BC state value are not consistent with a first hash value stored in a memory of the device:
            discarding the BC block, and
        when the content of the BC block and the BC state value are consistent with the first hash value stored in the memory:
            replacing, in the memory, the first hash value with the second hash value,
            parsing the time value from the BC block,
            providing a first indication of the time value on a user interface of the device,
            receiving a second indication from the user interface,
            when the second indication indicates that the time value is rejected:
                sending, to a secure element (SE) housed in the device, a message indicating that the time value in the BC block is rejected;
            when the second indication indicates that the time value is not rejected:
                sending, to the SE, the BC block and a message indicating that the time value in the BC block is not rejected.

16. The method of 15, further comprising:
    by the device:
        obtaining a plurality of BC blocks;
        verifying each BC block in the plurality of BC blocks;
        dividing the plurality of BC blocks into a plurality of batches; and
        when the second indication indicates that the time value is not rejected:
            sending a first batch of the plurality of batches to the SE, wherein a size of the first batch is chosen to not exceed a memory capacity of the SE.

17. The method of claim 16, wherein the plurality of batches is ordered in time such that the plurality of batches includes a most recent batch in time.

18. The method of claim 17, wherein the first batch is the most recent batch in time.

19. The method of claim 17, wherein the first batch is not the most recent batch in time.

20. The method of claim 15, wherein the time value originates from a network time source.

* * * * *

UNITED STATES PATENT AND TRADEMARK OFFICE
CERTIFICATE OF CORRECTION

PATENT NO. : 10,680,833 B2
APPLICATION NO. : 15/686023
DATED : June 9, 2020
INVENTOR(S) : Xiangying Yang It is certified that error appears in the above-identified patent and that said Letters Patent is hereby corrected as shown below:

In the Specification

At Column 14, Line 63: "a signed certificate to a CA 520. The CA 120 can prove to" should read -- a signed certificate to a CA 560. The CA 120 can prove to --.

At Column 15, Line 7-10: "The server 130, the CA 120, the CI 302, the CA 520 and/or the server 530, may provide time information to the SE 102 via messages 510, 520, 530, 540, and 550, respectively." should read -- The server 130, the CA 120, the CI 302, the CA 560 and/or the server 570, may provide time information to the SE 110 via messages 510, 520, 530, 540, and 550, respectively. --.

At Column 15, Line 28: "associated with, for example, the server 530." should read -- associated with, for example, the server 570. --.

At Column 15, Line 34: "530 has not been compromised, and so is not listed in the" should read -- 570 has not been compromised, and so is not listed in the --.

At Column 15, Line 65: "server 530 with the old epoch value and the OCSP stapled" should read -- server 570 with the old epoch value and the OCSP stapled --.

At Column 15, Line 67: "530. If the identity of the server 530 is not on the CRL and" should read -- 570. If the identity of the server 570 is not on the CRL and --.

At Column 16, Line 1: "the SE 110 either has a certificate of the server 530 with the" should read -- the SE 110 either has a certificate of the server 570 with the --.

At Column 16, Line 4: "stapled message 454 for the server 530 and the time infor-" should read -- stapled message 454 for the server 570 and the time infor- --.

Signed and Sealed this
Thirty-first Day of January, 2023

Katherine Kelly Vidal
*Director of the United States Patent and Trademark Office*

CERTIFICATE OF CORRECTION (continued)
U.S. Pat. No. 10,680,833 B2

At Column 16, Line 6-7: "continue to use the certificate it has for the server 530; otherwise, the SE 110 can place the identity of the server 530" should read -- continue to use the certificate it has for the server 570; otherwise, the SE 110 can place the identity of the server 570 --.

At Column 16, Line 10-11: "of the server 530 if i) the existing certificate for the server 530 has the most recent epoch value, and ii) the difference" should read -- of the server 570 if i) the existing certificate for the server 570 has the most recent epoch value, and ii) the difference --.

At Column 16, Line 59: "a profile 116. The profile 116 can include an ISD-P 922. An" should read -- a eSIM 116. The eSIM 116 can include an ISD-P 922. An --.

At Column 16, Line 64: "received bound profile package. The profile 116 can also" should read -- received bound profile package. The eSIM 116 can also --.

At Column 16, Line 67: "of the device 118 (for example, MNO 910). The profile 116" should read -- of the device 118 (for example, MNO 910). The eSIM 116 --.

At Column 18, Line 34: "entities 1220 and the device 118 housing the SE 110. CA 120" should read -- entities 1240 and the device 118 housing the SE 110. CA 120 --.

At Column 18, Line 47: "sends the time in a message 136 to the network entities 1220." should read -- sends the time in a message 136 to the network entities 1240. --.

At Column 18, Line 48: "The network entities 1220 send the received time value to" should read -- The network entities 1240 send the received time value to --.

At Column 18, Line 54: "If any of the server 130, the network entities 1220, the" should read -- If any of the server 130, the network entities 1240, the --.

At Column 18, Line 67: "110. FIG. 13A illustrates servers 130 and 530, but in general" should read -- 110. FIG. 13A illustrates servers 130 and 570, but in general --.

At Column 19, Line 27: "the SE 110 and reaches the server 530. The public key 132" should read -- the SE 110 and reaches the server 570. The public key 132 --.

At Column 19, Line 31: "The server 530 then checks the time it received from the" should read -- The server 570 then checks the time it received from the --.

At Column 19, Line 34: "the server 530 is generally different than the time 1211. A" should read -- the server 570 is generally different than the time 1211. A --.

At Column 19, Line 36: "value TR, and then check TR. The server 530 checks the" should read -- value TR, and then check TR. The server 570 checks the --.

At Column 19, Line 39: "Rule of the Window. The server 530 uses its own version of" should read -- Rule of the Window. The server 570 uses its own version of --.

CERTIFICATE OF CORRECTION (continued)
U.S. Pat. No. 10,680,833 B2

At Column 19, Line 42-43: "of the server 530. If TR satisfies the test applied by the server 530, then the server 530 creates the message 1221 by signing" should read -- of the server 570. If TR satisfies the test applied by the server 570, then the server 530 creates the message 1221 by signing --.

At Column 19, Line 46-47: "server 530 has a private key – public key pair, and the server 530 distributes its public key using a certificate signed over" should read -- server 570 has a private key – public key pair, and the server 570 distributes its public key using a certificate signed over --.

At Column 19, Line 50: "13A, to the server 530 is by the connection 1310." should read -- 13A, to the server 570 is by the connection 1310. --.

At Column 19, Line 64: "If none of the server 130, the server 530 or the device OS" should read -- If none of the server 130, the server 570 or the device OS --.

At Column 20, Line 4: "keys of servers 130 and 530). If the signatures are success" should read -- keys of servers 130 and 570). If the signatures are success --.

At Column 20, Line 7: "Scenario 1 Logic" should read -- Logic, Scenario 1 --.

At Column 21, Line 13: "Server 1420 behaves in a similar way to the server 530 of" should read -- Server 1420 behaves in a similar way to the server 570 of --.

At Column 23, Line 13: "FIG. 15B illustrates exemplary blockchain details 1540." should read -- FIG. 15B illustrates exemplary blockchain details 1560. --.

At Column 23, Line 27: "FIG. 15C provides logic 1550 for scenario 3 performed in" should read -- FIG. 15C provides logic 1580 for scenario 3 performed in --.